(12) United States Patent
Stahl et al.

(10) Patent No.: US 10,719,989 B2
(45) Date of Patent: Jul. 21, 2020

(54) SUGGESTION OF CONTENT WITHIN AUGMENTED-REALITY ENVIRONMENTS

(71) Applicant: Facebook, Inc., Menlo Park, CA (US)

(72) Inventors: Justin David Stahl, San Francisco, CA (US); Narin Sead, San Jose, CA (US); Tullie Murrell, San Francisco, CA (US); Gregory Daniel Louis Germe, Oakland, CA (US); Steven Kish, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/112,407

(22) Filed: Aug. 24, 2018

(65) Prior Publication Data

US 2020/0066044 A1 Feb. 27, 2020

(51) Int. Cl.
| | | |
|---|---|---|
| *G06T 19/00* | (2011.01) | |
| *G06F 16/9535* | (2019.01) | |
| *G06K 9/00* | (2006.01) | |
| *G06Q 50/00* | (2012.01) | |

(52) U.S. Cl.
CPC ........ *G06T 19/006* (2013.01); *G06F 16/9535* (2019.01); *G06K 9/00671* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2011/0214082 A1* | 9/2011 | Osterhout | G02B 27/017 715/773 |
| 2014/0028712 A1 | 1/2014 | Keating | |
| 2016/0109954 A1* | 4/2016 | Harris | G06F 3/017 345/156 |
| 2016/0267759 A1* | 9/2016 | Kerzner | G08B 13/19645 |
| 2016/0379408 A1* | 12/2016 | Wright | G06T 19/006 345/633 |
| 2017/0221371 A1* | 8/2017 | Yang | G09B 5/06 |
| 2018/0356885 A1* | 12/2018 | Ross | G06F 3/013 |
| 2019/0019346 A1* | 1/2019 | Cuthbertson | G06T 19/006 |
| 2019/0102946 A1* | 4/2019 | Spivack | G06T 19/003 |

FOREIGN PATENT DOCUMENTS

WO WO 2016209605 A1 12/2016

OTHER PUBLICATIONS

International Search Report and Written Opinion for International Application No. PCT/US2019/047840, dated Feb. 19, 2020.

* cited by examiner

*Primary Examiner* — Xiao M Wu
*Assistant Examiner* — Steven Z Elbinger
(74) *Attorney, Agent, or Firm* — Baker Botts L.L.P.

(57) ABSTRACT

In one embodiment, a method includes rendering an augmented-reality environment on a display associated with a first computing device associated with a first user; identifying one or more objects within the augmented-reality environment; determining a suggested augmented-reality content item based on social-networking information associated with the first user, and further based on characteristics associated with the identified objects; and presenting the suggested augmented-reality content item on a display associated with the first computing device.

20 Claims, 19 Drawing Sheets

SUGGESTION OF CONTENT WITHIN AUGMENTED-REALITY ENVIRONMENTS

TECHNICAL FIELD

This disclosure generally relates to augmented or virtual reality environments.

BACKGROUND

Augmented Reality (AR) effects are computer-generated visual effects (e.g., images and animation) that are superimposed or integrated into a user's view of a real-world scene. Certain AR effects may be configured to track objects in the real world. For example, a computer-generated unicorn may be placed on a real-world table as captured in a video. As the table moves in the captured video (e.g., due to the camera moving or the table being carried away), the generated unicorn may follow the table so that it continues to appear on top of the table. To achieve this effect, an AR application may use tracking algorithms to track the positions and/or orientations of objects appearing in the real-world scene and use the resulting tracking data to generate the appropriate AR effect. Since AR effects may augment the real-world scene in real-time or near real-time while the scene is being observed, tracking data may need to be generated in real-time or near real-time so that the AR effect appears as desired.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

SUMMARY OF PARTICULAR EMBODIMENTS

In particular embodiments, a processor of a first computing device may receive first information from one or more sensors associated with the first computing device. This may include information about images captured at the sensors. For example, the sensors may include a camera that captures photo images. In particular embodiments, a computing system (e.g., the first computing device, a server) may receive second information from a second computing device. The second information may include information about images captured at one or more sensors associated with the second computing device. In particular embodiments, a computing system may identify one or more first points within the first images and one or more second points within the second images. These points may correspond to features of interest in the images. In particular embodiments, a computing system may "relocalize" the first computing device and the second computing device within a shared AR environment. This relocalization process may be an initialization or re-initialization process that may be used to orient an AR device within an AR environment.

The disclosed invention may provide several technological benefits. For example, the relocalization of multiple devices may allow for collaboration among multiple devices in mapping a real-world environment onto an AR environment and tracking objects within the real-world or AR environments. This collaboration among multiple devices may markedly improve the mapping process by reducing the time and effort it takes to map an environment. This improvement may be particularly pronounced and its benefits may compound significantly in cases where the real-world environment that is to be mapped is very large. As an example and not by way of limitation, the time and effort involved with mapping of a large football stadium may be significantly reduced if thirty users can relocalize and map the stadium separately to create a shared AR environment that includes all the points that they each mapped out separately.

In particular embodiments, a user may share or present an AR content item to other users within an AR environment. In particular embodiments, a first computing device associated with a first user may render an AR environment on a display associated with the first computing device. In particular embodiments, a computing system may determine that the first computing device is authorized to access a particular AR content item associated with a location within the AR environment based on social-networking information associated with the first user. The particular AR content item may be associated with a second user. In particular embodiments, the first computing device may receive information configured to render the AR content item at the associated location within the AR environment. In particular embodiments, the AR content item may be rendered on the display associated with the first computing device, such that it appears within the AR environment.

In particular embodiments, the AR content item may be integrated into the AR environment and tied to particular locations or objects identified in the environment. By so doing, a more immersive experience may be created for a user viewing an AR environment, such that the AR content may be perceived as being an integral part of the real-world environment being modeled by the AR environment. In particular embodiments, the first user may be able to view or interact with the AR content item in intuitive ways (e.g., picking them up, moving them, modifying them, etc.).

In particular embodiments, an AR environment may be rendered. In particular embodiments, one or more objects (e.g., a face, an animal, a real-world inanimate object, a virtual object, etc.) may be identified within an AR environment rendered on a display associated with a first computing device associated with a first user. In particular embodiments, a computing system may determine one or more suggested AR content items for the first user. In particular embodiments, the determination as to what content to suggest may be based on social-networking information associated with the first user. In particular embodiments, the determination as to what content to suggest may be based on characteristics associated with the objects identified in the AR environment. In particular embodiments, the suggested AR content item may be presented as suggestions on a display associated with the first computing device. A user may then be able to select a suggested AR content item and interact with it (e.g., by placing it at a location within the AR environment).

By providing a suggestion tool that intelligently determines optimal AR content that is tailored to the user and the circumstances, users may be encouraged to place AR content within an AR environment or otherwise interact with objects in the AR environment. The suggestion tool may allow for discovery of content that may be particularly relevant to a user (e.g., content created by friends of the user, content tailored to the user's interests, etc.) at any given time.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
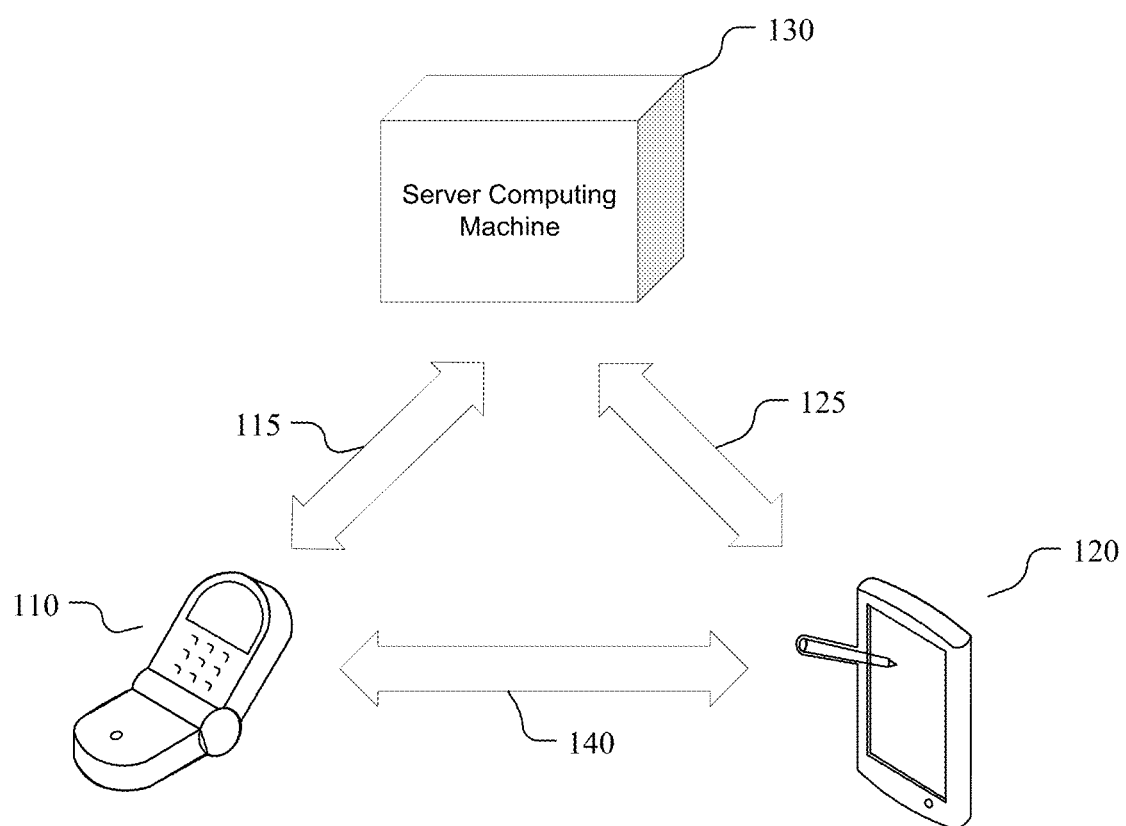
FIG. 1 illustrates example embodiments of multiple devices configured to communicate information with each other.

In particular embodiments, an AR application may be configured to operate on any computing device, including mobile devices (e.g., smartphones, tablets, laptops, AR glasses) and other types of computing devices (e.g., desktop computers). In particular embodiments, an AR application may be configured to obtain images (e.g., video frames) of a real-world environment captured by a camera communicatively coupled to the device on which the AR application is running. By processing the images, the AR application may track real-world objects captured within the images.

In particular embodiments, the AR application may support one or more types of tracking algorithms, which may be used to create a map of a real-world environment to create an AR environment (e.g., an AR representation of the real-world environment). Users may view, interact, or otherwise engage with the AR environment on any AR compatible computing device. As an example and not by way of limitation, a user may be able to view AR content items (e.g., a doodle, a GIF, an avatar, a filter, a mask) within the AR environment. Although this disclosure focuses on AR devices and environments, it contemplates applying the same concepts in the context of virtual-reality (VR) devices and environments. For the purposes of this disclosure, the term "augmented reality" (or AR) also refers to what may sometimes be referred to as "mixed reality."

In particular embodiments, a processor of a first computing device may receive first information from one or more sensors associated with the first computing device. This may include information about images captured at the sensors. For example, the sensors may include a camera that captures photo images. In particular embodiments, a computing system (e.g., the first computing device, a server) may receive second information from a second computing device. The second information may include information about images captured at one or more sensors associated with the second computing device. In particular embodiments, a computing system may identify one or more first points within the first images and one or more second points within the second images. These points may correspond to features of interest in the images. In particular embodiments, a computing system may "relocalize" the first computing device and the second computing device within a shared AR environment. This relocalization process may be an initialization or re-initialization process that may be used to orient an AR device within an AR environment.

The disclosed invention may provide several technological benefits. For example, the relocalization of multiple devices may allow for collaboration among multiple devices in mapping a real-world environment onto an AR environment and tracking objects within the real-world or AR environments. This collaboration among multiple devices may markedly improve the mapping process by reducing the time and effort it takes to map an environment. This improvement may be particularly pronounced and its benefits may compound significantly in cases where the real-world environment that is to be mapped is very large. As an example and not by way of limitation, the time and effort involved with mapping of a large football stadium may be significantly reduced if thirty users can relocalize and map the stadium separately to create a shared AR environment that includes all the points that they each mapped out separately.

In particular embodiments, a user may share or present an AR content item to other users within an AR environment. In particular embodiments, a first computing device associated with a first user may render an AR environment on a display associated with the first computing device. In particular embodiments, a computing system may determine that the first computing device is authorized to access a particular AR content item associated with a location within the AR environment based on social-networking information associated with the first user. The particular AR content item may be associated with a second user. In particular embodiments, the first computing device may receive information configured to render the AR content item at the associated location within the AR environment. In particular embodiments, the AR content item may be rendered on the display associated with the first computing device, such that it appears within the AR environment.

In particular embodiments, the AR content item may be integrated into the AR environment and tied to particular locations or objects identified in the environment. By so doing, a more immersive experience may be created for a user viewing an AR environment, such that the AR content may be perceived as being an integral part of the real-world environment being modeled by the AR environment. In particular embodiments, the first user may be able to view or interact with the AR content item in intuitive ways (e.g., picking them up, moving them, modifying them, etc.).

In particular embodiments, an AR environment may be rendered. In particular embodiments, one or more objects (e.g., a face, an animal, a real-world inanimate object, a virtual object, etc.) may be identified within an AR environment rendered on a display associated with a first computing device associated with a first user. In particular embodiments, a computing system may determine one or more suggested AR content items for the first user. In particular embodiments, the determination as to what content to suggest may be based on social-networking information associated with the first user. In particular embodiments, the determination as to what content to suggest may be based on characteristics associated with the objects identified in the AR environment. In particular embodiments, the suggested AR content item may be presented as suggestions on a display associated with the first computing device. A user may then be able to select a suggested AR content item and interact with it (e.g., by placing it at a location within the AR environment).

By providing a suggestion tool that intelligently determines optimal AR content that is tailored to the user and the circumstances, users may be encouraged to place AR content within an AR environment or otherwise interact with objects in the AR environment. The suggestion tool may allow for discovery of content that may be particularly relevant to a user (e.g., content created by friends of the user, content tailored to the user's interests, etc.) at any given time.

One example of a tracking algorithm is Simultaneous Localization and Mapping (SLAM). At a high-level, SLAM is a technique that may be used to generate a 3D map of an unknown environment (e.g., in real time). The SLAM technique may employ sensor data from a variety of sensors, including, for example, cameras, LiDAR sensors, radar, gyroscope, and any other suitable types of sensors. In particular embodiments, SLAM implemented on conventional mobile phones may use the phone's camera(s), gyroscope, and/or accelerometer. Conceptually, given a video frame, SLAM may estimate the relative position and orientation of the camera and features of interest in the scene (e.g., often edges, corners, etc.) and iteratively update the estimates based on motion and the resulting feature observations. Based on positional deviations of those features due to movement, SLAM may use triangulation techniques to generate a 3D model of the recognizable objects in the captured scene. For example, when the camera moves, a landmark point associated with a feature of interest may move. Movement of that landmark (and other landmarks) may be used to estimate the 3D position and orientation of objects.

Another example of a tracking algorithm is face tracking. In particular embodiments, face-detection algorithms may use machine-learning models to detect facial features (e.g., eyes, nose, mouth, etc.) and generate a facial mesh using points mapped to those features. In essence, a 3D model of the face may be generated to track a person's face (and/or feature) movement and orientation. The facial mesh in particular embodiments may be an assembly of multiple (e.g., 32, 64, etc.) polygons (e.g., triangles, squares, etc.) that approximates the contours of a detected face. Using the facial mesh, the tracking algorithm may try to match the facial mesh with the face detected in each video frame. How well the facial mesh fits the face captured in a video frame may be represented as a confidence score (e.g., based on distance measurements and whether facial features corresponding to particular polygons are detectable). When the user's face is occluded (e.g., due to another object or the face turning in a manner that hides the user's face from view), the confidence score may drop. In particular embodiments, the confidence score may be 0 or 1, with 0 representing an undetectable face and 1 representing a detectable face (or vice versa). In particular embodiments, a simple face tracking algorithm may track a face based on estimated dimensions of a face or facial features. As an example and not by way of limitation, the simple face tracking algorithm may estimate that a face is nine inches based on a known average (which may be determined using machine-learning models that analyze images) and overlay a facial mesh that maps facial features based on average proportions of facial features.

Another example of a tracking algorithm is region tracking, which is an appearance-based tracker in accordance with particular embodiments. In particular embodiments, the region-tracking algorithm in particular embodiments mainly process 2D pixel or texture information (aside from possibly generating a plane to model the location of an object in a video frame and using gyroscope data to determine the plane's orientation in 3D space). At a high-level, the region-tracking algorithm may seek to identify a region in a video frame that corresponds to an object and sees how it transforms in the next frame. In particular embodiments, the region-tracking algorithm may identify and track successive positions of the object in a series of video frames. Pixels of each video frame may be processed using a segmentation algorithm to identify segments that may correspond to real-world objects. The particular segmentation algorithm used may be, for example, motion-based or intensity-based, known to persons of ordinary skill in the art. Each identified segment may be labeled and represented using a polygon to approximate its shape and location within the scene. Each polygon's motion between frames may be assumed to be a 2D affine transformation. Using the object's polygon representation and the corresponding motion model (e.g., a machine-learning classifier) a prediction may be made as to where and how the polygon would appear in the next frame. The prediction may be compared to actual segments observed in that frame, and the object's polygon and motion model may be updated accordingly. Over several iterations, the algorithm may be able to detect with a level of confidence that two polygons appearing in their respective frames are likely the same object and label them as such. The confidence level may drop, however, if an object is sufficiently occluded (e.g., hidden by another object), transformed beyond the predictive ability of the current model, and/or lighting conditions changed significantly to hamper image processing.

Another example tracking algorithm may simply use gyroscope data. As an example and not by way of limitation, a mobile device may have a built-in gyroscope, which may provide gyroscope data that describes the orientations of the associated mobile device. The orientation data may be purely based on the gyroscope sensor, and as such no image processing may be needed. More information on AR tracking or mapping algorithms may be found in U.S. patent application Ser. No. 15/803,428, filed 3 Nov. 2017, which is incorporated herein by reference.

Mapping and Collaboration

In particular embodiments, a processor of a first computing device may receive first information from one or more sensors associated with the first computing device. The first information may include information associated with one or more images captured at the sensors. As described elsewhere herein, the term "sensor" may include any suitable sensor (e.g., a camera, a LiDAR sensor, a radar sensor) that is capable of capturing an image. The term "image," when used herein to describe what is captured at a sensor, refers to a representation of an environment (e.g., a representation of an environment surrounding the sensor). As an example and not by way of limitation, the term may describe a visual representation (e.g., a photo) of an environment as captured by a camera. As another example and not by way of limitation, the term may describe a collection of data representing distances to tangible surfaces of an environment as captured by a LiDAR sensor. In particular embodiments, the first information may be information sufficient to reconstruct some or all of the image. As an example and not by way of limitation, in the case where the sensor is a smartphone camera, the first information may encode an image in a raw image format (e.g., an unprocessed pixel buffer directly sourced from the camera) or any other suitable image file format (e.g., JPEG, BMP, GIF, PNG).

In particular embodiments, the first computing device may be a client computing device (e.g., a mobile computing device, a desktop device, a stylus device). In particular embodiments, the first computing device may include a processor, a sensor, and functionality for determining its location, direction, or orientation (e.g., a GPS receiver, an inertial movement unit (IMU), a compass, a gyroscope, an accelerometer). The first computing device may also include functionality for wired communication, or wireless communication, such as BLUETOOTH communication, near-field communication (NFC), infrared (IR) communication, or communication with wireless local area networks (WLANs) or cellular-telephone networks.

In particular embodiments, the first computing device may include a display that is able to render an AR environment (e.g., on an AR application). In these embodiments, the first computing device may render an AR environment that is based on the images captured at one or more sensors associated with the first computing device. As an example and not by way of limitation, the first computing device may be a smartphone with a screen that displays an AR environment based on images captured with one or more associated local cameras.

In particular embodiments, the first computing device may not include a display that is able to render an AR environment. As an example and not by way of limitation, the first computing device may be a mobile computing device that may resemble a stylus or marker (referenced herein as a "stylus device"). In this example, the first computing device may still include a sensor that captures images. As another example and not by way of limitation, the computing device may be a smartphone with a camera. In this example, the camera of the smartphone may capture one or more images that may be sent to a processor of the smartphone for processing.

FIG. 1 illustrates example embodiments of multiple devices configured to communicate information with each other. In particular embodiments, a computing system may receive second information from a second computing device. The second information may include information associated with one or more second images captured at one or more sensors associated with the second computing device. In particular embodiments, the second computing device may be a client computing device (e.g., a mobile computing device, a desktop device, a stylus device). In particular embodiments, the computing system may be the first computing device. As an example and not by way of limitation, the second computing device may be in direct wired or wireless communication with the first computing device (e.g., via BLUETOOTH). In this example, referencing FIG. 1, the first computing device 110 may receive the second information from the second computing device 120 via the connection 140. In particular embodiments, referencing the example in FIG. 1, the second computing device 120 may receive information from the first computing device 110 via the connection 140 (e.g., first information associated with first images captured at the first sensor).

In particular embodiments, the computing system may be a server computing machine. In these embodiments, the server computing machine may act as an intermediary. As an example and not by way of limitation, referencing FIG. 1, the first computing device 110 may send the first information to the server computing machine 130 via the connection 115. Similarly, in this example, the second computing device 120 may send the second information to the server computing machine 130 via the connection 125. In particular embodiments, a hybrid communication system may be user, where not all of the computing devices may be communicating with the server computing machine. As an example and not by way of limitation, referencing FIG. 1, the first communication device 110 may send the first information to the second computing device 120 via the connection 140, and the second computing device 120 may send both the first information and the second information to the server computing machine 130 via the connection 125. In this example, the computing device 110 may not have established the connection 115 (e.g., because it may lack authorization to do so, or it may otherwise be incapable of doing so for hardware or software reasons).

In particular embodiments, the first computing device and the second computing device may both be operated by a single user. As an example and not by way of limitation, the first computing device may be a device with a display (e.g., a smartphone) and the second computing device may be a device without a display (e.g., a stylus device, a controller). In this example, a user may view an AR environment with the first computing device and interact with the AR environment (e.g., by placing an AR content item in the AR environment) with the second computing device. In particular embodiments, the first computing device may be operated by a first user and the second computing device may be operated by a second user. Although this disclosure focuses on examples with two computing devices, it contemplates that any number of such devices may be in communication with each other (e.g., receiving and transmitting image information among themselves).

In particular embodiments, a computing system may identify one or more first points within the first images. In particular embodiments, a computing system may identify one or more second points within the second images. In particular embodiments, the computing system may be the first computing device or the second computing device. As an example and not by way of limitation, the first computing device (or the second computing device) may locally process the images to identify points in the images. In particular embodiments, the computing system may be a server computing machine. As an example and not by way of limitation, the computing system may be a remote server associated with the social-networking system 1660 described herein. In particular embodiments, the computing system may be a combination of multiple devices. As an example and not by way of limitation, the processing tasks required to identify points within an image may be performed by both the first computing device and a server computing machine. As another example and not by way of limitation, the processing tasks may be performed by the first computing device, the second computing device and a server computing machine.

Figure 2:
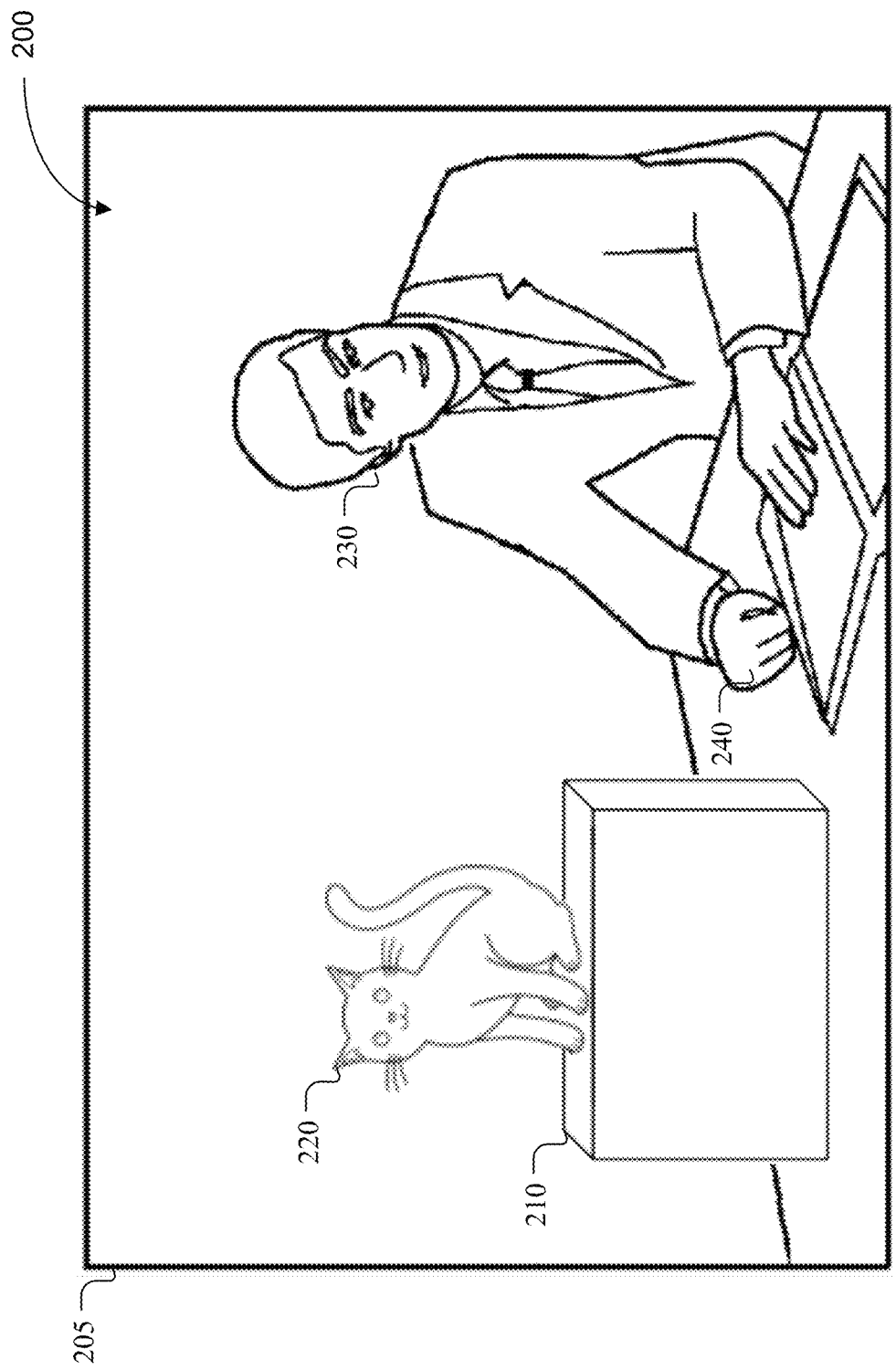
FIG. 2 illustrates an example real-world scene captured within an image or video frame.

In particular embodiments, the computing system may use one or more suitable tracking algorithms to identify these points in the first and second images. As used herein, the term "points" refers to features of interest in an image or a series of images. In particular embodiments, a point may refer to features such as corners or edges that may be identified in an image. In particular embodiments, a point may refer to an object identified in an image (e.g., a polygon corresponding to an object or face in the corresponding real-world environment). FIG. 2 illustrates an example real-world scene 200 captured within an image or video frame 205. The illustrated scene 200 includes a box 210 with a cat 220 on top. The scene 200 further includes a person sitting at a desk, with his face 230 and hand 240 visible. In particular embodiments, the video frame 205, along with successive frames, may be processed by the AR application using one or more tracking algorithms to track objects of interest. In particular embodiments, the objects of interest may include any object that a user of the AR application taps on or interacts with through the AR application (e.g., the user may associate an AR effect with a particular object, modify the object, magnify the object, etc.). In particular embodiments, the objects of interest may additionally or alternatively include any discernable or detectable object by the tracking algorithm.

Figure 3:
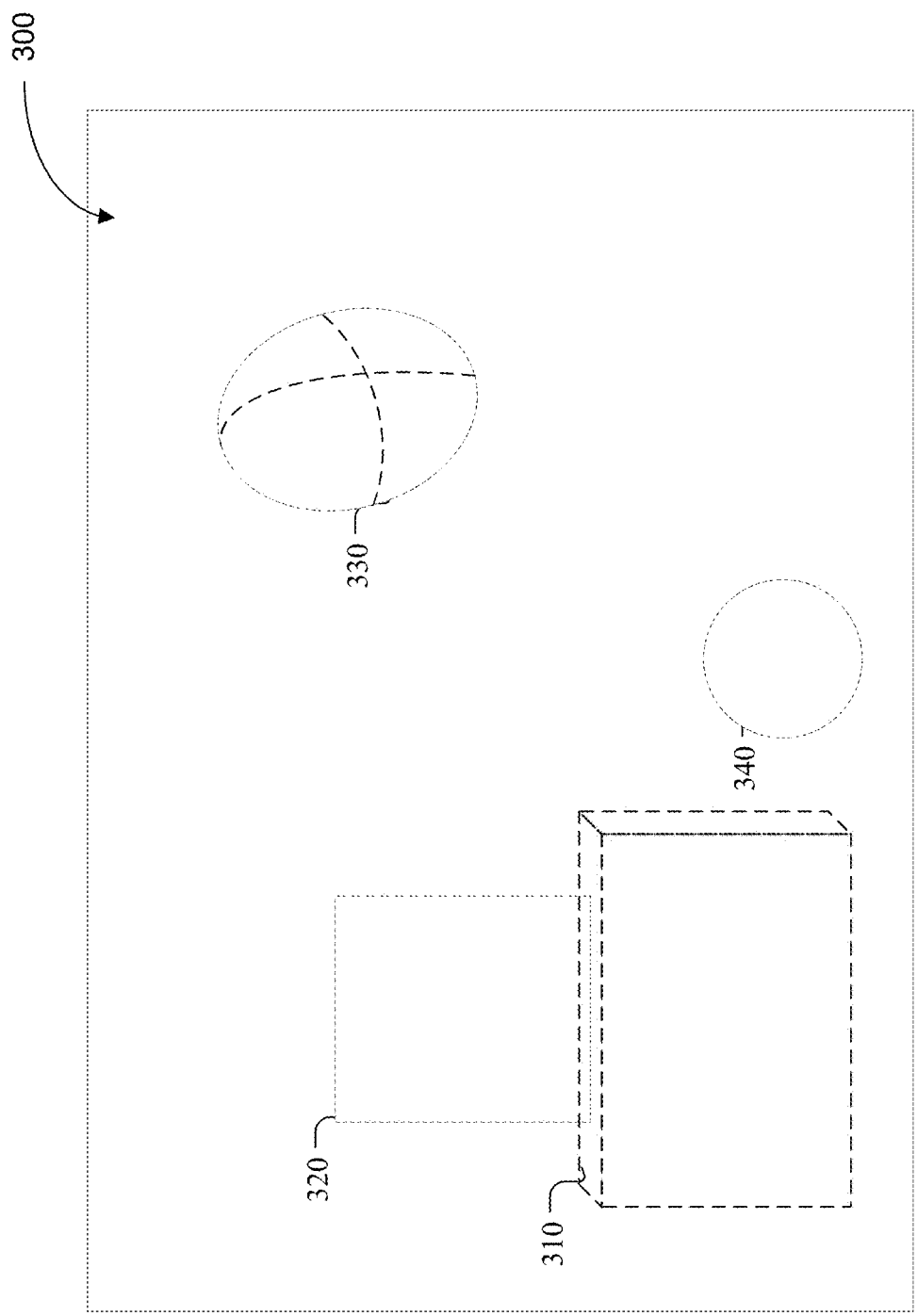
FIG. 3 illustrates an example of an image with identified points associated with certain objects of interest.
Figure 4:
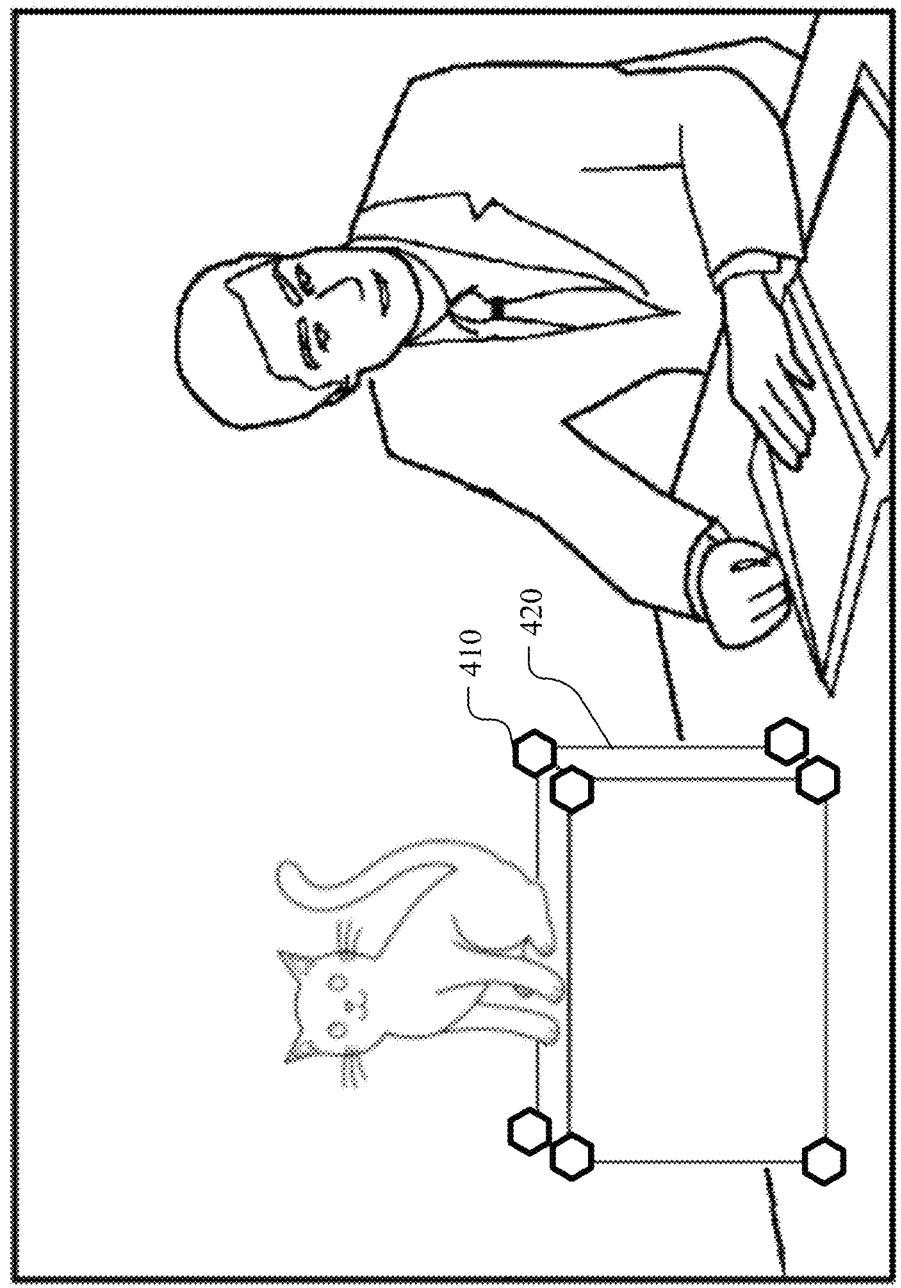
FIG. 4 illustrates another example of an image with identified points associated with an object of interest.

FIG. 3 illustrates an example of an image with identified points associated with certain objects of interest. FIG. 4 illustrates another example of an image with identified points associated with an object of interest. The visual representation of tracking data 300 may be associated with the real-world scene 200 (e.g., an image representing at least a portion of a real-world environment) shown in FIG. 2. As an example and not by way of limitation, box 310 in FIG. 3 may represent tracking data for the real-world box 210 in FIG. 2; polygon 320 in FIG. 3 may represent tracking data for the cat 220 in FIG. 2; facial mesh 330 in FIG. 3 may represent tracking data for the person's face 230 in FIG. 2; and circle 340 in FIG. 3 may represent tracking data for the person's hand 240 in FIG. 2. In particular embodiments, each of these shapes and meshes may be tracked as points within the image (and ultimately, within the AR environment that may be generated based on the image). In particular embodiments, the points may be smaller visual markers within the image that track an object of interest. As an example and not by way of limitation, referencing FIG. 3, a series of visual markers 310 may track the corners of the box 310 in the image, which may correspond to the real-world box 210 in FIG. 2. In particular embodiments, the tracking data associated with the objects of interest in a scene may be generated using one or more tracking algorithms operating concurrently. For example, tracking data represented by box 310 may be generated using Simultaneous Localization and Mapping (SLAM); tracking data represented by polygon 320 may be generated using region-tracking algorithm; tracking data represented by facial mesh 330 may be generated using a face-tracking algorithm; and tracking data represented by circle 340 may be generated using a hand-tracking algorithm. In particular embodiments, the tracking algorithm used for tracking a particular object or region may be switched or adjusted independently from any other tracking algorithms used for tracking other objects or regions in the scene. For example, while the tracking algorithm used for tracking the person's face 230 may dynamically switch from facial-tracking algorithm to region-tracking algorithm, the tracking algorithms used for tracking the other objects (e.g., the box 210, cat 220, and/or hand 240) may remain unchanged. In particular embodiments, one or more tracking algorithms may track features such as corners and edges that may correspond to real-world objects. As an example and not by way of limitation, referencing FIG. 4, a tracking algorithm may track the corners (e.g., the corner 410) of the box 420.

In particular embodiments, a computing system may relocalize the first computing device and the second computing device within a shared AR environment. As used herein, the terms "relocalizing" and "relocalization" may refer to an initialization or re-initialization process that may be used to orient an AR device within an AR environment. In cases where there is a single computing device viewing, mapping, otherwise interacting with an AR environment, relocalization may be necessary when there has been a tracking failure. As an example and not by way of limitation, when a camera of the single computing device is temporarily obscured, it may lose its bearings (e.g., location, orientation) with respect to the AR environment. In this example, the single computing device would need to be relocalized ("or re-initialized") to the AR environment such that it understands where it is. This may be done by comparing features or points of newly acquired images with features or points in memory that were extracted from images acquired before the tracking failure. In the case of multiple computing devices (e.g., the first computing device and the second computing device), a similar relocalization process may occur as a first initialization process (or a re-initialization if a tracking failure occurs at any point). As an example and not by way of limitation, a first computing device may relocalize to a shared AR environment by comparing features or points of first images (e.g., captured by its own associated sensors) to the features or points of second images (e.g., captured by sensors of a second computing device). In this example, the first computing device and the second computing device may both orient and place each other within the shared AR environment.

Figure 5:
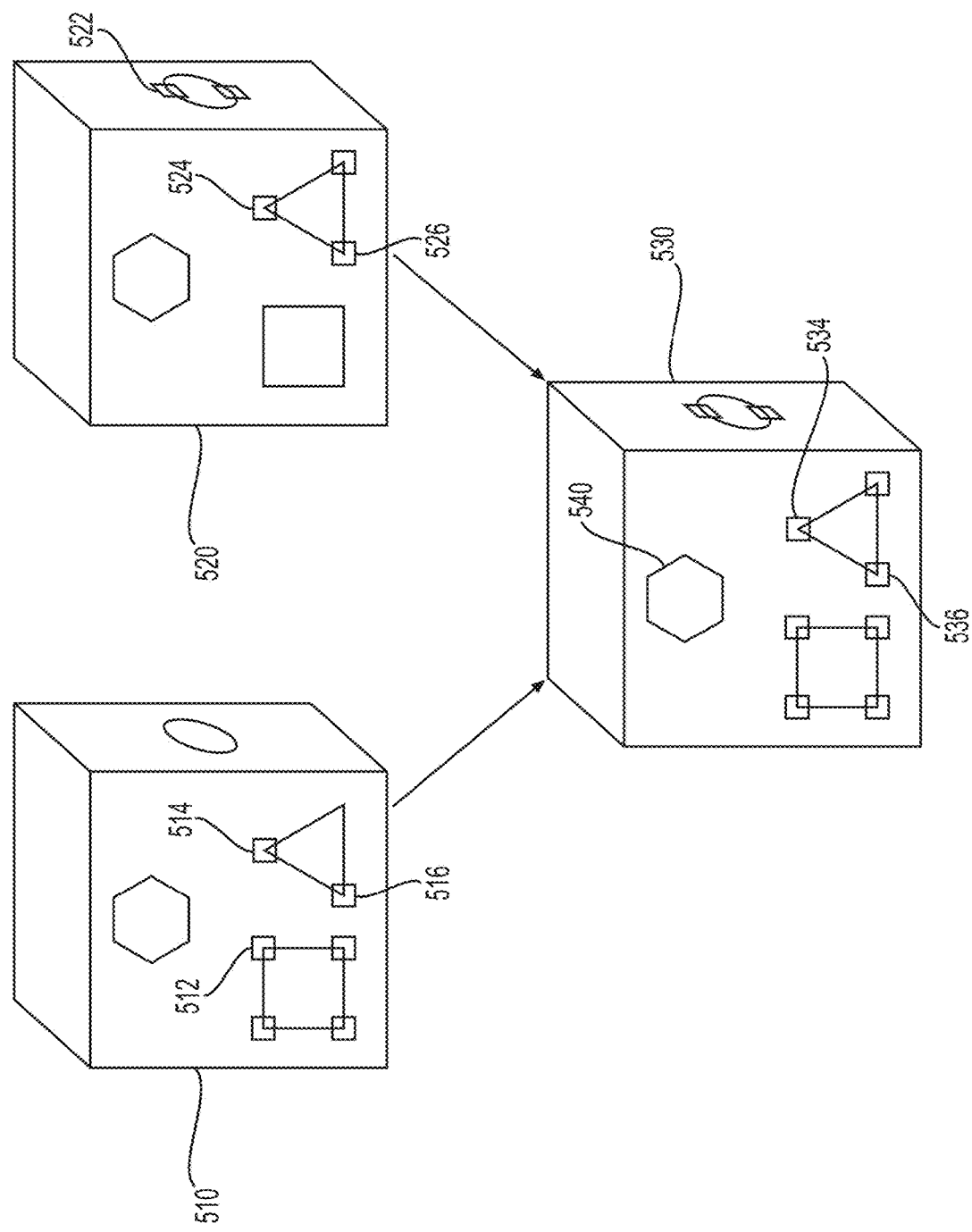
FIG. 5 illustrates an example abstraction of the concept of relocalizing multiple coordinate spaces.

FIG. 5 illustrates an example abstraction of the concept of relocalizing multiple coordinate spaces. In particular embodiments, the relocalization process may include defining a first coordinate space including the first points that were determined from the first images. As an example and not by way of limitation, referencing FIG. 5, the first coordinate space 510 may include several points (e.g., 512, 514, and 516) determined from images captured by a first computing device. These points may correspond to corners of shapes in the images (e.g., the square and the triangle in FIG. 5), or to any other suitable features (e.g., changes in texture, color, etc.). Each of these first points may be associated with a respective coordinate within the first coordinate space based on the first information. In particular embodiments, the relocalization process may include defining a second coordinate space comprising the second points that were determined from the second images. As an example and not by way of limitation, referencing FIG. 5, the second coordinate space 520 may include several points (e.g., 522, 524, and 526) determined from images captured by a first computing device. In this example, these points may correspond to corners of shapes in the images (e.g., the triangle and the circle in FIG. 5). Each of these second points may be associated with a coordinate within the second coordinate space based on the second information. In particular embodiments, the relocalization process may include identifying one or more shared points. Each shared point may be a point at which a particular first point and a particular second point intersects. As an example and not by way of limitation, referencing FIG. 5, the points 514 and 516 in the first coordinate space 510 may be determined to intersect with the points 524 and 526, respectively in the second coordinate space 520, and may consequently be identified as shared points. In particular embodiments, the relocalization process may include combining the first coordinate space with the second coordinate space to create a shared coordinate space that corresponds to a shared AR environment. This shared AR environment may be created based on the identified shared points. As an example and not by way of limitation, referencing FIG. 5, the first coordinate space 510 may be combined with the second coordinate space 520 to create the shared coordinate space 530, which may correspond to a shared AR environment. In this example, the points 514 and 524 may be determined to correspond to the same feature (e.g., the top corner of the triangle illustrated in FIG. 5) in a real-world environment, and the points 516 may be determined to correspond to the same feature in a real-world environment. As a result, the points 514 and 524 may be collapsed into a single point 534 in the shared coordinate space 530, and the points 516 and 526 may be collapsed into a single point 536 in the shared coordinate space 530. In particular embodiments, once the computing devices have been relocalized with common reference points, the locations of the computing devices (or their associated sensors) may be determined within the shared coordinate space, and thereby within the shared AR environment.

In particular embodiments, relocalization may occur among computing devices only when their respective users have authorized the pairing or the computing devices. As an example and not by way of limitation, when it is determined that a first computing device has tracked a predefined number of points in a real-world environment, and when it is determined that a second computing device is also in the real-world environment, a prompt may be provided to a first user of the first computing device to ask if the first user wants to relocalize with the second computing device (e.g., of a second user, or of the same first user). Both the first user and the second user may receive similar prompts. In this example, if both users accept, the two computing devices may relocalize, and may then collaborate in mapping the environment.

In particular embodiments, it may be determined that the first computing device and the second computing device are in the same real-world environment if they are within a threshold distance of each other. As an example and not by way of limitation, this distance may be determined by a BLUETOOTH pairing range, and the computing devices may discover each other by a BLUETOOTH discovery protocol. As another example and not by way of limitation, this distance may be a predetermined radius and the locations of the computing devices may be determined by GPS. As another example and not by way of limitation, social-networking information associated with one or more users of the computing devices may be leveraged to determine that the computing devices are within the same real-world environment. For example, if a first user enjoys pizza and dislikes burgers and if a second user has the opposite tastes, and if a pizza restaurant is next door to a burger restaurant, it may be determined that the first user is in the pizza restaurant and the second users in the burger restaurant. This may be useful in cases where the pizza restaurant and the burger restaurant are identical and very close to each other, in which case the computing devices of the two users may mistakenly relocalize within an incorrect shared AR environment. By accounting for the fact that the first user and the second user are unlikely to be in the same restaurant in this example, this mistaken relocalization may be prevented.

In particular embodiments, once multiple computing devices have been relocalized to a shared AR environment, they may each individually be aware of their location and orientation in the shared AR environment (e.g., because they may each have sensors capable of capturing image information to remain anchored within the shared AR environment). This may be advantageous in that each device may be able to reliably interact with the shared AR environment individually, without requiring corroboration from the other devices. As an example and not by way of limitation, a user may be creating an AR drawing in an AR environment by tracing its outline with a stylus device, and this process may be viewed by a tablet device that has been relocalized to the AR environment. In this example, even if the tablet device is turned away from the stylus device, the drawing process may continue uninterrupted because a camera on the stylus device ensures that the stylus remains anchored to the AR environment.

In particular embodiments, once multiple computing devices have been relocalized to a shared AR environment with the computing devices initialized to have common reference points, they may be able to collaborate to map the AR environment in real time. As an example and not by way of limitation, referencing FIG. 5, the points discovered individually by the first computing device and the second computing device may be aggregated in the shared coordinate space 530. In this example, the users may continue to map the environment by tracking additional points (e.g., points corresponding to the hexagon 540). In particular embodiments, this mapping may occur in real-time, and the computing devices that are collaborating may repeatedly sync up to share update information that indicates additional points since the last sync (e.g., newly discovered points). As an example and not by way of limitation, the computing devices may sync up periodically based on a predefined period (e.g., every two minutes) or whenever a threshold number of additional second points is identified (e.g., each time a new point is discover, each time five new points is discovered, etc.). In particular embodiments, information associated with an entire map may be sent from one computing device to another. As an example and not by way of limitation, a newly relocalized computing device may simply receive a map from another computing device (e.g., one that has the most up-to-date map).

In particular embodiments, two or more maps may be intelligently merged to create a master map. As an example and not by way of limitation, if two maps have two points (e.g., a polygon corresponding to an object) that are determined to be matching or otherwise associated with the same object or location in two maps, one of the two points may be selected for incorporation into the master map. The points may each have a confidence score that may indicate the likelihood that the point is accurate. This confidence score of a point may be determined based on, for example, the number of perspectives (e.g., as provided by different images) from which the respective point was identified. A higher number of perspectives may yield a higher confidence score for the point. For example, a point that was identified in images from ten different perspectives may have a higher confidence score than a point that was identified in images from five different perspectives. In this example, the point with the higher confidence could be incorporated into the master map. This intelligent merging may increase the accuracy of the master map. In particular embodiments, the master map may be considered the most up-to-date map, and may be sent to one or more devices (e.g., following its creation). In particular embodiments, information describing a particular point from one perspective (e.g., from a first device) may be combined with information describing the point from another perspective (e.g., from a second device). This may increase the efficiency of the mapping process and maximize the confidence of the resulting map.

In particular embodiments, any changes that occur in an environment may be continuously or semi-continuously communicated to computing devices viewing the AR environment. As an example and not by way of limitation, if a particular user moves or creates an AR content, a computing device that detects this change (e.g., the computing device of the particular user) may communicate the change to other computing devices that are viewing the AR environment. The other computing devices may accordingly update their local rendering of the AR environment and the associated local maps. As another example and not by way of limitation, if a real-world object within the environment is moved (e.g., a person may have shifted a chair), a computing device may communicate the change to other computing devices.

In particular embodiments, collaboration may be initiated only when the users involved have explicitly authorized it. As an example and not by way of limitation, users that are relocalized within an AR environment may receive a prompt asking whether they want to collaborate together in further mapping the AR environment.

In particular embodiments, a prompt for relocation or collaboration may only be offered to computing devices that are within a particular group of users. As an example and not by way of limitation, a first computing device may be in this group, with respect to a second computing device, if privacy settings associated with the second computing device explicitly include the first computing device as being part of the group. As another example and not by way of limitation, the prompt may only be offered for users who are part of the same social-network group (e.g., the group named "Cool Dog Group") on an online social network, or users who watch tennis (e.g., as determined based on associated social-graph information). In particular embodiments, the prompt may be offered only to users who share particular characteristics (e.g., based on demographic information, based on profile information, based on user affinities as determined by social-graph information, etc.). In particular embodiments, the prompt may only be offered for users who are determined to be attending a common event (e.g., based on their location, based on their respective calendar data, based on their RSVP or registration to the event). As an example and not by way of limitation, at a hotel hosting both a medical conference and a Star Trek convention, users attending the medical conference may be prompted to collaborate with each other but not with users attending the Star Trek convention. In particular embodiments, relocalization or collaboration may only be offered for social connections. As an example and not by way of limitation, only users that are at least first-degree (or second-degree) social connections may be prompted to relocalize. In this example, an online social network may be queried (e.g., by the computing devices of the users) to determine whether users are first-degree social connections. An associated social-networking system may access a social graph and determine if nodes corresponding to the respective users are connected by a single edge (and optionally, if that edge is a friend-type edge, indicating that the users are friends on the online social network). In particular embodiments, relocation or collaboration may occur automatically (e.g., for friends of the user, for users attending the same event, for users who are part of the same group) without requiring a prompt if the associated user has explicitly allowed for this in associated privacy settings. In particular embodiments, users may override any of these restrictions and relocalize or collaborate with any users they want if all parties are in agreement.

The disclosed collaboration process may markedly improve the mapping process by reducing the time and effort it takes to map a real-world environment onto an AR environment. This improvement may be particularly pronounced and its benefits may compound significantly in cases where the real-world environment that is to be mapped is very large. As an example and not by way of limitation, the time and effort involved with mapping of a large football stadium may be significantly reduced if thirty users can relocalize and map the stadium separately to create a shared AR environment that includes all the points that they each mapped out separately. As another example and not by way of limitation, the same football stadium may be mapped by crowdsourcing information from a large number of users. For example, if a subset of attendees at a football game in the stadium have affirmatively asked or otherwise explicitly authorized a network (e.g., an online social network, a peer-to-peer network, devices of friends) to collect point data from their computing devices, their computing device may transmit the point data to the network (e.g., a server of an online social network, directly to users of a peer-to-peer network, directly to devices of friends). In particular embodiments, a real-world environment may be mapped by multiple computing devices taking photos or videos at different locations in the real-world environment if their respective users have explicitly authorized this mapping and collaboration. As an example and not by way of limitation, if a set of users attending a concert have explicitly authorized this mapping and collaboration (e.g., by going to a privacy settings menu and enabling this feature), whenever they take a photo or video with their smartphone within the concert venue, the resulting images can be used to map the environment. Alternatively, a separate sensor may be used to capture images for mapping purposes (e.g., low-resolution images captured by a different camera). In these examples, one or more images may also be captured leading up to the point where the user actually takes a photo or video (i.e., a period of time immediately preceding the taking of the photo or video as the user frames the photo or video), to further aid with tracking points and mapping the environment.

In particular embodiments, the mapping and collaboration feature may be enabled only for a period of time and may be automatically disabled after the period of time expires. In particular embodiments, the mapping and collaboration feature may be enabled only while the computing device is within a specified real-world area and may be automatically disabled after the device leaves that area. As an example and not by way of limitation, a user may enable the feature when the user is attending a concert, but the feature may be automatically disabled as soon as the user exits the concert venue.

In particular embodiments, a computing device may be used to place AR content items within an AR environment. As an example and not by way of limitation, a server (or a client computing device, for example in the case where client computing devices are in direct communication without a server as an intermediary) may receive content information from a computing device, wherein the content may include information defining one or more locations in an AR environment and information specifying an AR content item. In particular embodiments, the AR content item may be placed within the AR environment at a location associated with the defined locations. In particular embodiments, the AR environment and the AR may be rendered on a display associated with a computing device.

Figure 6:
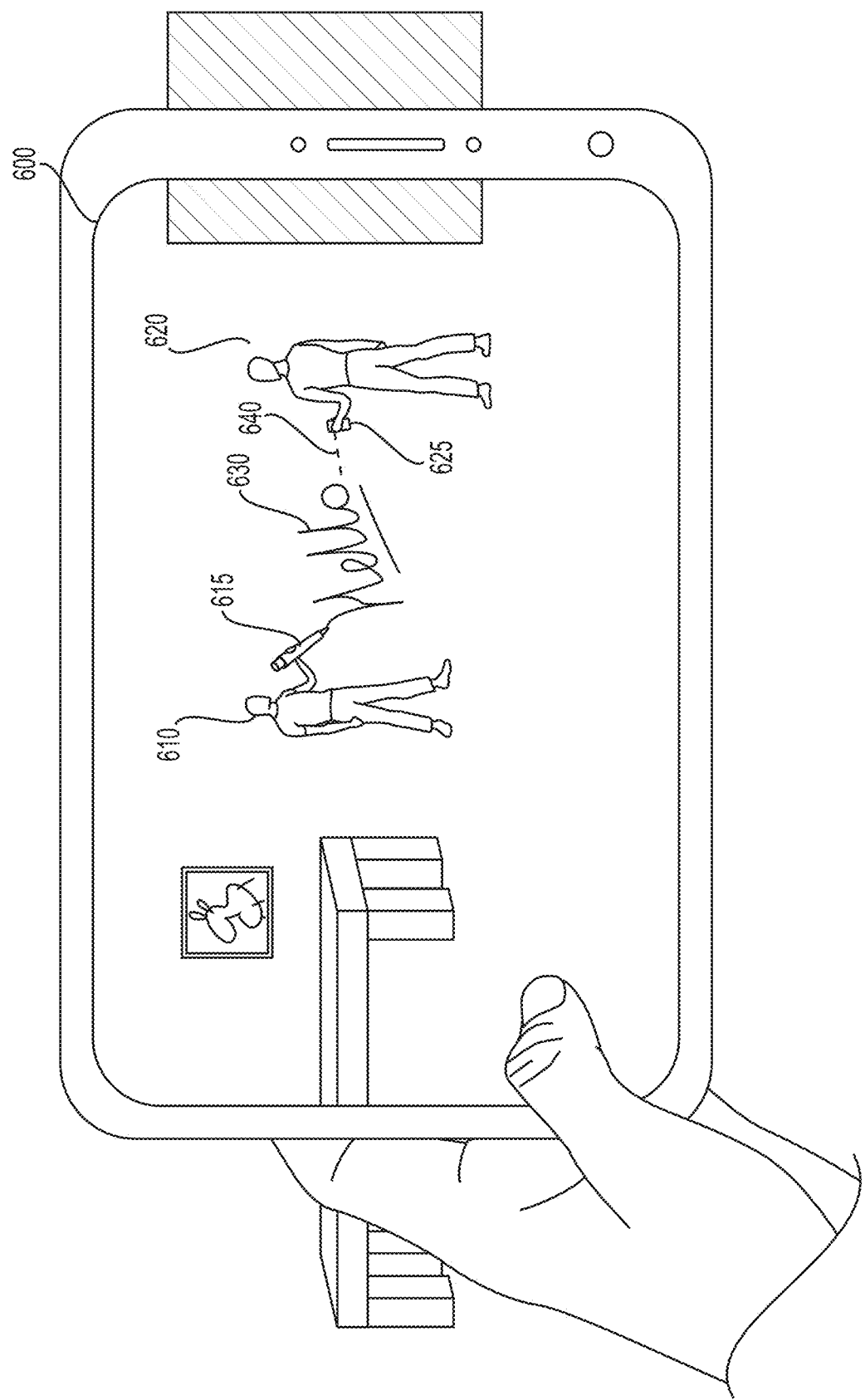
FIG. 6 illustrates an example of placing AR content items within an AR environment.

FIG. 6 illustrates an example of placing AR content items within an AR environment. Multiple users may collaborate to place an AR content item. In particular embodiments, "placing" the AR content item within the AR environment may include the act of drawing an AR content item. Referencing FIG. 6, as an example and not by way of limitation, a first user 610 and a second user 620 may collaborate to place a drawing 630 within the AR environment shown in a display 600 of a third user's computing device. In this example, the first user may use a stylus device 615 and the second user may use a smartphone 625 to create the drawing 630. In this example, the first user may use a series of gestures with the stylus device 615, tracing the drawing 630 in the air with the tip of the stylus device 615. The drawing 630 may appear within the AR environment from a drawing point, which may be the tip of the stylus device 615. Similarly, the second user 620 may use the smartphone 625 to draw from the other side. In this example, the drawing point may be spaced away from the smartphone 625 by a predefined distance 640. In this example, a sensor on the computing devices (e.g., stylus device 615, the smartphone 625) may determine the locations of the computing devices while the drawing is being traced (e.g., based on a plurality of acquired images, based on a gyroscope, etc.) to determine the drawing and its location.

Figure 7A:
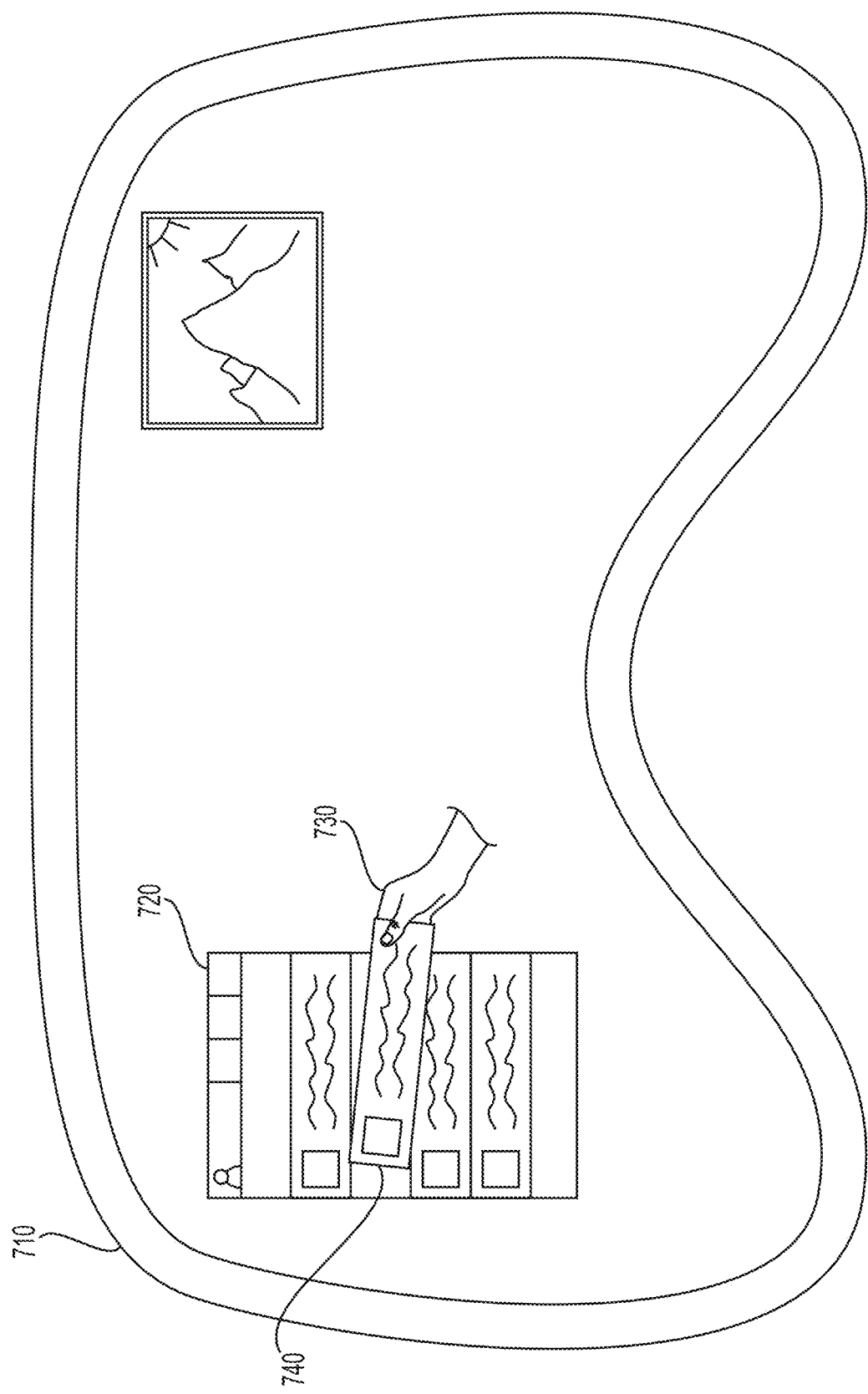
FIGS. 7A-7B illustrate an example of placing a visual representation of a social-network post within an AR environment.
Figure 7B:
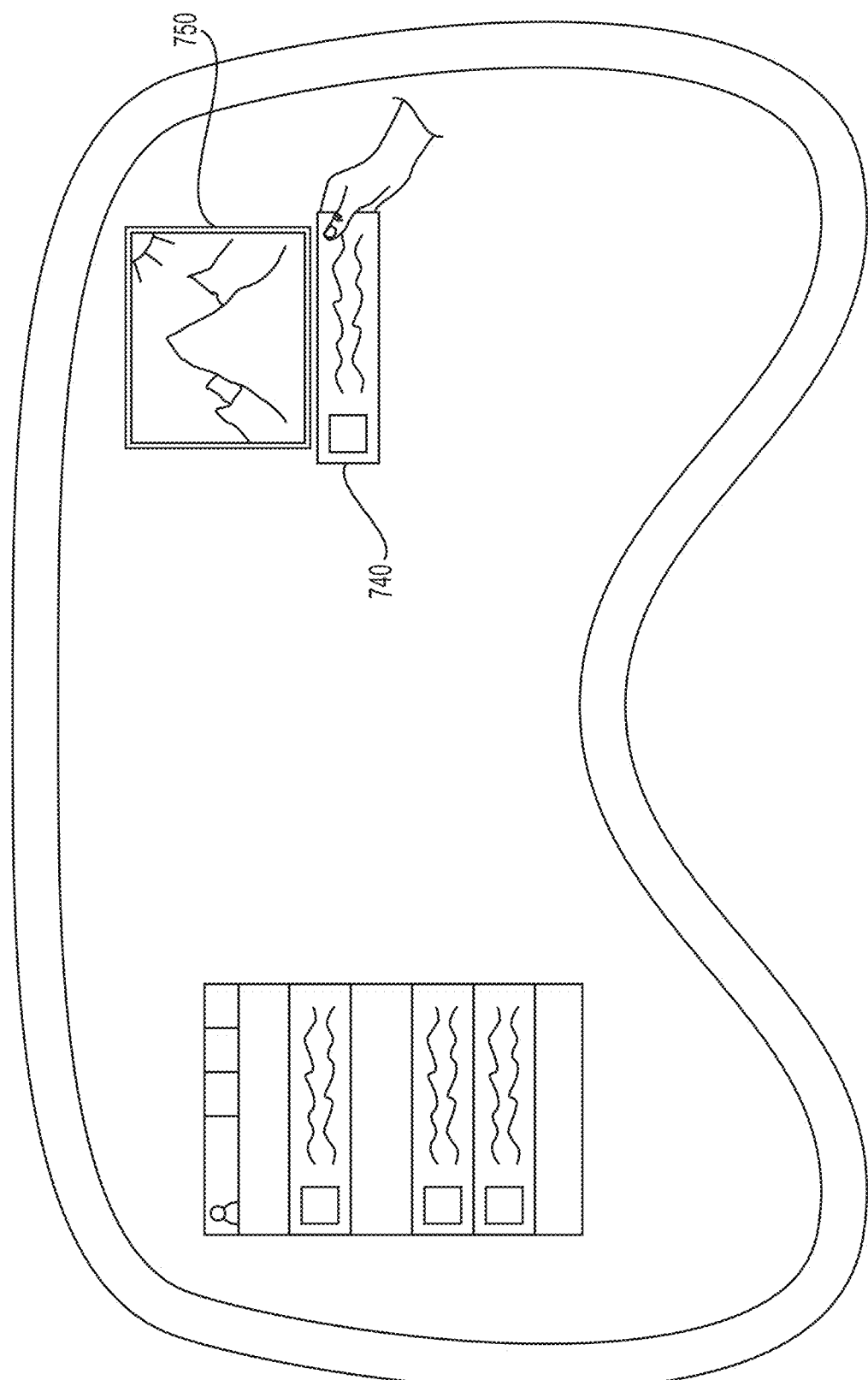

In particular embodiments, the AR content item may be a visual representation of a post or other communication. FIGS. 7A-7B illustrate an example of placing a visual representation of a social-network post within an AR environment. As an example and not by way of limitation, referencing FIG. 7A, a user of a first computing device such as a virtual reality device may access an interface 720 of an online social network (e.g., a newsfeed interface), which may be displayed in a portion of a view on a display unit 710 (e.g., a virtual-reality headset, and AR headset) of the first computing device. In this example the user may be able to manipulate a representation 730 of the user's hand (e.g., with a gesture input using a controller, with a gaze input using the display unit 710) to "pick up" or otherwise select a representation of a user post 740 from the interface 720. In this example, now referencing FIG. 7B, the user may place the visual representation of the user post 740 at a specific location within the AR environment—under the painting 750 (e.g., because the user post may have been a comment from a friend about the painting 750).

In particular embodiments, the AR content item may include a photo, a video, an image file (e.g., a GIF, a meme), an emoji, a sticker, text, a filter, a mask, a drawing, or any other suitable item. In particular embodiments, the AR content item may include a virtual object. As an example and not by way of limitation, the AR content item may be a three-dimensional virtual representation of an object such as a balloon or a tree. As another example and not by way of limitation, the AR content item may be an interactive virtual object such as a video player or video game window within which a user in the AR environment can interact.

In particular embodiments, the AR content item may be placed in association with one or more detected objects in the AR environment. As an example and not by way of limitation, a user of a computing device may draw a mustache on an object that is determined to be a face of another user in the AR environment. In this example, the mustache may remain on the other user's face indefinitely, for a defined period of time, or until some action is performed to remove the mustache (e.g., a gesture to "wash away" the mustache). In particular embodiments, the AR content item may be a mask that is configured to be overlaid on an object identified in the shared AR environment. As an example and not by way of limitation, a user of a computing device may overlay a mask on a face of another user who appears in the AR environment. The mask may be applied to a facial mesh of the face, such that in the AR environment, it may appear that the face has a mask over it. The mask may cover the entire face or just a portion of it (e.g., it may simply be a mustache mask). In particular embodiments, the AR content item may be a filter overlay that is configured to be overlaid on a rendering of the shared AR environment. As an example and not by way of limitation, a user may apply a Holiday-themed filter to an environment, which may automatically add virtual objects (e.g., a virtual wreath, virtual snow) to locations within the AR environment, or affect color, brightness, contrast, or other suitable display settings.

In particular embodiments, any particular AR environment or its associated content may only be rendered on computing devices that are authorized to access the AR environment and/or its associated content. A computing device may be authorized to access an AR environment and/or its associated content if privacy settings associated with the AR environment and/or the content grant access to the computing device or to a user associated with the computing device. As an example and not by way of limitation, a particular AR environment may only be visible to friends (e.g., first-degree social connections) of the users who collaborated to map the AR environment. In particular embodiments, a computing device may be authorized to access an AR environment associated with a particular event if the associated user is determined to be attending the particular event (e.g., based on their location, based on their respective calendar data, based on their RSVP or registration to the event). As an example and not by way of limitation, users attending a Star Wars convention may only be able to see an AR environment that includes content related to the Star Wars convention (e.g., information about events, avatars of characters from the movie Star Wars), and users attending a medical conference in the same area may see an AR environment that includes content related to the medical conference (e.g., information about seminars, the title of a seminar overlaid above a door leading to the respective seminar, arrows leading to a catered lunch during a lunch break). In particular embodiments, a computing device may be authorized if it is associated with a user who is a within a particular group. As an example and not by way of limitation, a computing device may be authorized to view content placed by the online-social-network group "Cool Dog Group" if the user is part of that group. As another example and not by way of limitation, a computing device may be authorized to view content related to a tennis game if the user is determined to be a tennis fan.

In particular embodiments, an AR depth-assist interface may be implemented on a computing device displaying an AR environment. Depth perception may be a problem for users viewing an AR environment on an AR device, particularly when the AR device does not provide stereo vision (e.g., in the case of a smartphone that offers a single handheld display screen). Not being able to perceive depth may make it challenging to users to place AR content items within an AR environment. It may also make it challenging for users to perceive AR content items as being connected to the real-world environment and may create a disconnect between the AR environment and the real-world environment, reducing the immersive experience. To solve this problem, a matrix or grid of visual markers may be overlaid on a rendering of an AR environment, with each visual marker corresponding to a respective coordinate within the AR environment. These visual markers may be configured to vary in appearance based on a distance of a display associated with a computing device rendering the AR environment and a location of the visual marker within an AR environment. As an example and not by way of limitation, virtual spheres (or dots) may be displayed to correspond to particular coordinate points throughout the AR environment, where the spheres in combination may create a grid pattern. In this example, when a user approaches a particular location (by bringing a display of the user's computing device toward the particular location), spheres around that location (and throughout the grid) may vary their appearance in any suitable way to reflect the new vantage point of the user. For example, a sphere's size may change (e.g., becoming larger as the user approaches), its level of transparency may change (e.g., becoming more opaque as the user approaches), its level of brightness may change (e.g., becoming brighter), and/or its color may change (e.g., its shading or hue may change based on distance).

Although this disclosure largely describes the invention with examples involving a first computing device and a second computing device, it contemplates having any number of such devices. As an example and not by way of limitation, there may be ten such computing devices capturing and transmitting image information among each other. For example, some or all of these ten computing devices may be together within a real-world environment (e.g., a room), with each computing device having sensors capturing images from different locations in the real-world environment. In this example, there may up to ten sets of images (first images, second images, . . . tenth images) and image information (first information, second information, . . . tenth information). These ten computing devices may all be relocalized based on these images. Building on this example, an eleventh computing device may join to collaborate with the other ten computing devices remotely. The eleventh computing device may be a virtual reality device that may receive image information about the real-world environment captured at the ten other computing devices. The eleventh computing device may also send image information to the other ten computing devices to relocalize the eleventh computing device in the shared AR environment even though the eleventh computing device is not in the real-world environment that is being modeled by the shared AR environment. Once the eleventh computing device is relocalized, the user of the eleventh computing device may be able to interact with the shared AR environment. As an example and not by way of limitation, the user of the eleventh computing device may draw a smiley face at a particular location within the shared AR environment. This smiley face may be visible in the shared AR environment to the ten other users when they view the shared AR environment on their respective computing devices. Similarly, the user of the eleventh computing device may see interactions by the other ten users within the shared AR environment. As an example and not by way of limitation, one of the other ten users may add to a drawing made by the user of the eleventh device (e.g., drawing a hat on the smiley face drawn by the user of the eleventh computing device).

Figure 8:
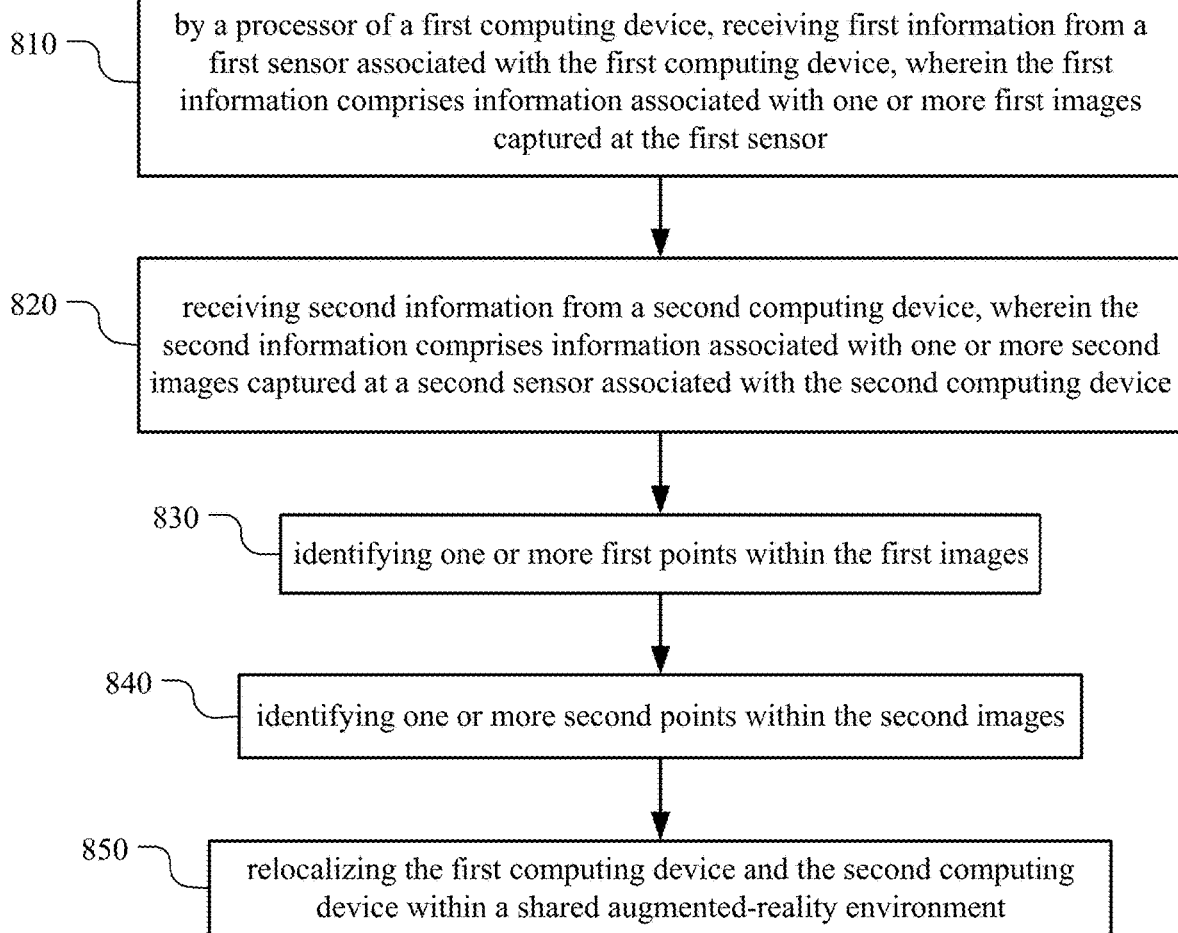
FIG. 8 illustrates an example method for mapping an environment with a first computing device and a second computing device.

FIG. 8 illustrates an example method 800 for mapping an environment with a first computing device and a second computing device. The method may begin at step 810, where a processor of a first computing device may receive first information from a first sensor associated with the first computing device, wherein the first information comprises information associated with one or more first images captured at the first sensor. At step 820, a computing system may receive second information from a second computing device, wherein the second information comprises information associated with one or more second images captured at a second sensor associated with the second computing device. At step 830, one or more first points may be identified within the first images. At step 840, one or more second points may be identified within the second images. At step 850, the first computing device and the second computing device may be relocalized within a shared AR environment. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. In particular embodiments, any suitable combination of steps may occur in parallel. Moreover, although this disclosure describes and illustrates an example method for mapping an environment with a first computing device and a second computing device, including the particular steps of the method of FIG. 8, this disclosure contemplates any suitable method for mapping an environment with a first computing device and a second computing device including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
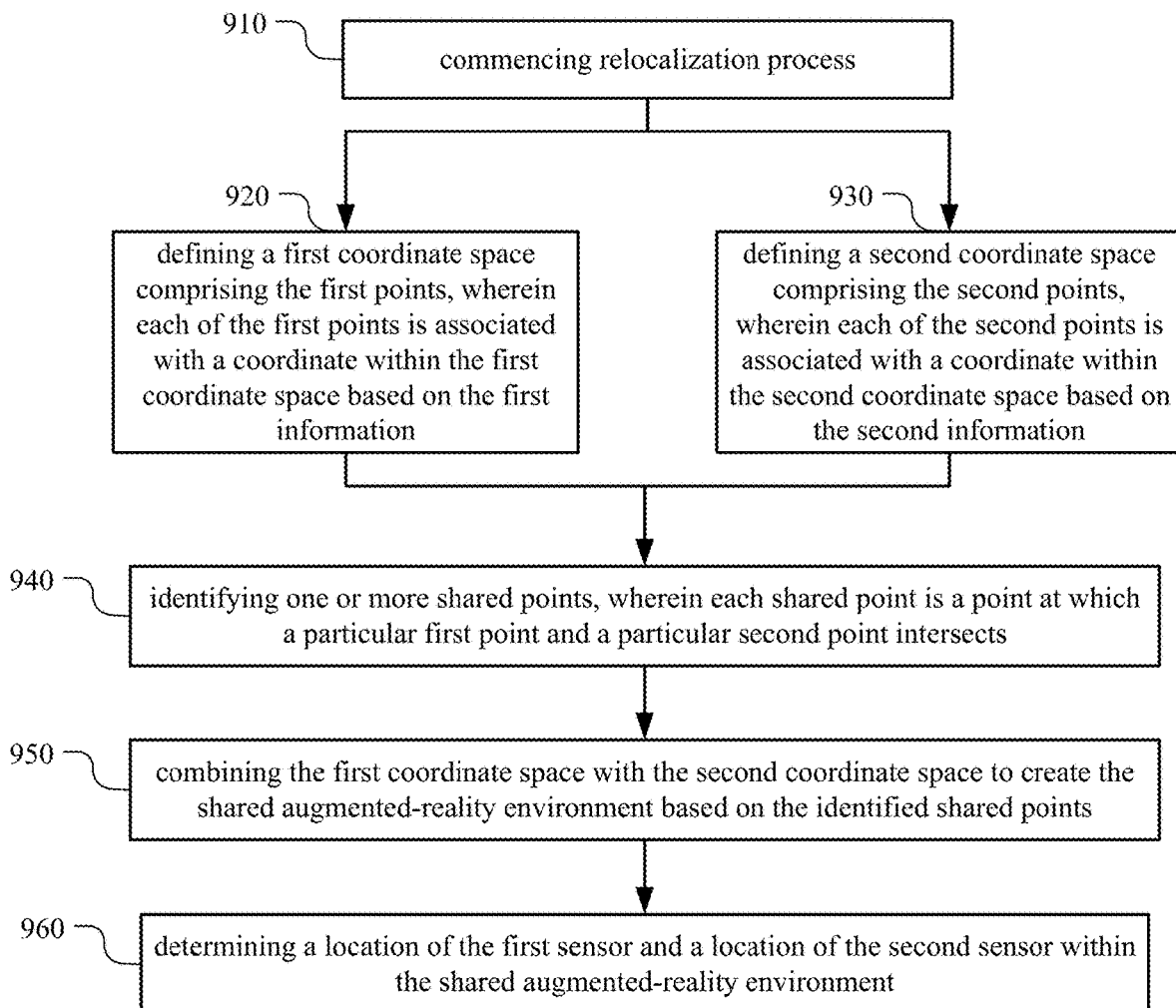
FIG. 9 illustrates an example method for relocalizing a first computing device and a second computing device within a shared AR environment.

FIG. 9 illustrates an example method 900 for relocalizing a first computing device and a second computing device within a shared AR environment. The method may begin at step 910, where a relocalization process is commenced. At step 920, a first coordinate space comprising the first points is defined, wherein each of the first points is associated with a coordinate within the first coordinate space based on the first information. At step 930, a second coordinate space comprising the second points is defined, wherein each of the second points is associated with a coordinate within the second coordinate space based on the second information. At step 940, one or more shared points is identified, wherein each shared point is a point at which a particular first point and a particular second point intersects. At step 950, the first coordinate space is combined with the second coordinate space to create the shared AR environment based on the identified shared points. At step 960, a location of the first sensor (e.g., the sensor associated with a first computing device) and a location of the second sensor (e.g., the sensor associated with a second computing device) within the shared AR environment. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. In particular embodiments, any suitable combination of steps may occur in parallel. Moreover, although this disclosure describes and illustrates an example method for relocalizing a first computing device and a second computing device within a shared AR environment including the particular steps of the method of FIG. 9, this disclosure contemplates any suitable method for relocalizing a first computing device and a second computing device within a shared AR environment including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9

Sharing of Content

In particular embodiments, a first computing device associated with a first user may render an AR environment on a display associated with the first computing device. In particular embodiments, a computing system may determine that the first computing device is authorized to access a particular AR content item associated with a location within the AR environment based on social-networking information associated with the first user. The particular AR content item may be associated with a second user. In particular embodiments, the computing system making the determination as to whether the first user is authorized to access the particular AR content item may be a server computing machine (e.g., a remote server of an online social network). In particular embodiments, a computing device may be authorized based on any other suitable factor or combination of factors, such as those disclosed above (e.g., with respect to authorization for relocalization/collaboration, or with respect to authorization for accessing an AR content item within an AR environment). As an example and not by way of limitation, the social-networking information may include information about affinities associated with the first user, demographic information associated with the first user, event information associated with the first user, or group affiliations of the first user. As another example and not by way of limitation, the determination that a computing device is authorized may further be based on one or more privacy settings associated with the AR content item. The privacy settings may, for example, be set by the second user. For example, the privacy settings may specify that only first-degree social connections of the first user are authorized.

In particular embodiments, the first computing device may receive information configured to render the AR content item at the associated location within the AR environment. In particular embodiments, the AR content item may be content that already exists within the AR environment. As an example and not by way of limitation, the AR content item may be content previously created and placed in the AR environment by other users. In particular embodiments, the AR content item may be rendered on the first computing device, in real-time, as the content is being placed within the AR environment. As an example and not by way of limitation, the computing device of the first user may render a drawing being created by a second user as the second user creates the drawing.

Figure 10:
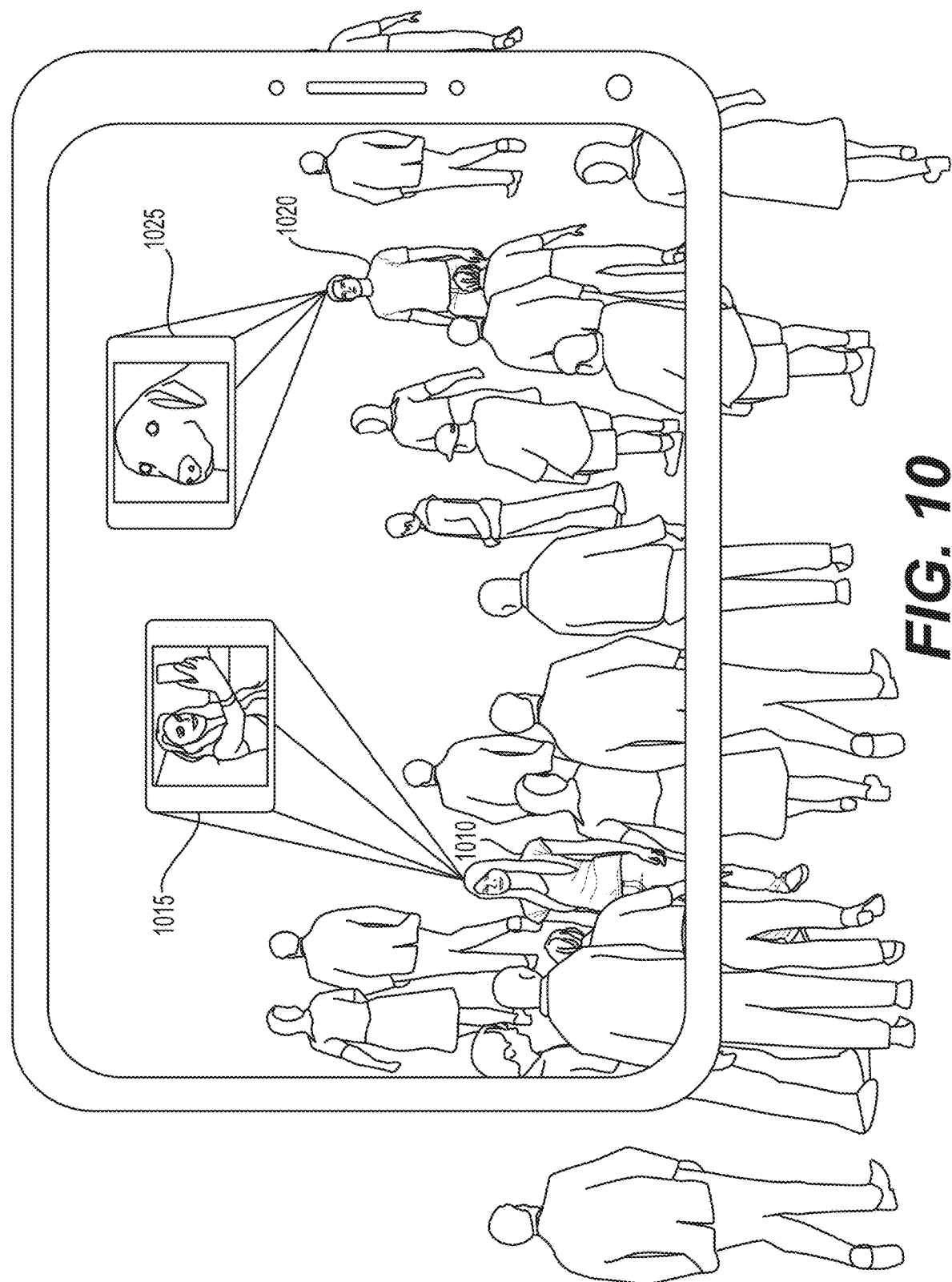
FIG. 10 illustrates an example of AR content items being rendered within a view of an AR environment.

In particular embodiments, the AR content item may be rendered on the display associated with the first computing device. The AR content item may be rendered within the AR environment (e.g., at an associated location). FIG. 10 illustrates an example of AR content items being rendered within a view of an AR environment. As an example and not by way of limitation, referencing FIG. 10, an AR environment corresponding to a concert venue may be displayed on a display 1000 of a first computing device. This AR environment may include AR content items uploaded by users. In particular embodiments, only certain AR content items may be visible to the first computing device. In particular embodiments, only AR content items that the first user is authorized to access may be visible (e.g., based on any combination of suitable factors disclosed above). As an example and not by way of limitation, only AR content items with privacy settings that authorize the first user to view the AR content item may be visible. For example, referencing FIG. 10, only the AR content item 1015 and the AR content item 1025 may be visible to the first user. In this example, the AR content item 1015 may be a selfie photo placed by the user 1010 and the AR content item 1025 may be a video placed by the user 1020. In particular embodiments, only AR content items placed by first-degree connections of the first user may be displayed.

Figure 11:
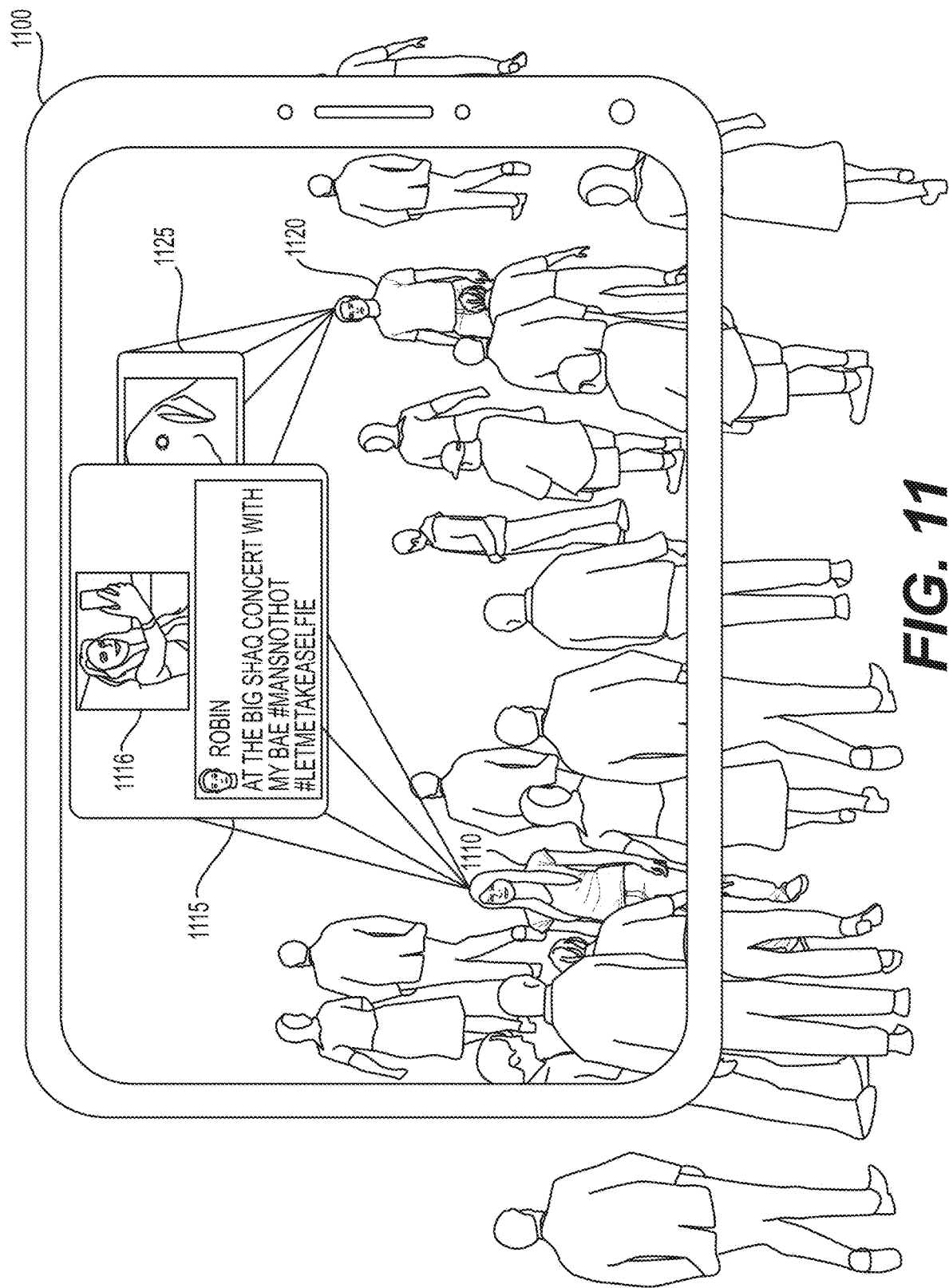
FIG. 11 illustrates an example of a user post being rendered within a view of an AR environment.

In particular embodiments, the AR content item may include communications (e.g., posts) on an online social network shared by an author user. These communications may be displayed in an AR environment to users who have access (e.g., friends of the author user, as determined based on a social graph associated with the online social network). FIG. 11 illustrates an example of a user post being rendered within a view of an AR environment. As an example and not by way of limitation, referencing FIG. 11, the user 1110 may have shared the post 1115 on an online social network including the selfie photo 1116 and associated text of the post (e.g., "at the Big Shaq concert with my bae # mansNotHot # letMeTakeASelfie"). In particular embodiments, the user 1110 may have explicitly defined in the privacy settings associated with the user 1110 that social network posts on a particular online social network be automatically placed in the AR environment (and displayed to other users who have access to the posts, e.g., as specified by privacy settings associated with the post). As an example and not by way of limitation, whenever the user 1110 shares a post (e.g., the post 1115) on the online social network, the post may be placed within an AR environment that the user 1110 is in.

In particular embodiments, particular AR content items may be emphasized or highlighted in any suitable manner. As an example and not by way of limitation, referencing FIG. 11, the post 1115 may be magnified and brought to the forefront of the view shown in display 1100 (e.g., displaying it over AR content item 1125 placed by user 1120). The AR content item that is emphasized may be determined based on its recency (e.g., bringing the most recently placed AR content item to the forefront) or any other suitable factor (e.g., magnifying an AR content item that is placed by users for whom the user viewing the AR environment has a high affinity). In particular embodiments, a particular AR content item may be emphasized based on a user input (e.g., a content-selection input as disclosed elsewhere herein).

In particular embodiments, the first user may be able to specify a filter that may be applied to cause only certain AR content items to be displayed. As an example and not by way of limitation, a first user may specify that only AR content items that were placed in the AR environment within the past two minutes may be displayed. As another example and not by way of limitation, the first user may specify that only AR content items placed by a specified group of friends may be displayed. As another example and not by way of limitation, the first user may specify that only certain content types may be displayed or that certain content types may not be displayed. For example, the first user may specify that no videos be displayed. The disclosed filtering functionality may be especially advantageous in a large AR environment where a large number of users may have placed content (e.g., at a sporting event). It may also serve to decrease processing loads on client computing devices rendering the AR environment, because fewer AR content items (including resource intensive videos, photos, and 3D objects) would need to be rendered on a client computing device at any given time. Reducing the number of AR content items may also decrease the load placed on a network (e.g., in the case where an intermediary server is needed) by reducing the amount of data that needs to be transmitted to individual client computing devices.

In particular embodiments, the AR environment may include, for an AR content item, an indication of the user who placed the AR content item (but only if the user has explicitly authorized the provision of this indication). As an example and not by way of limitation, referencing FIG. 10, the users 1010 may appear visually different from other users who have not placed any AR content item that is currently being displayed on the display 1000. As another example and not by way of limitation, again referencing FIG. 10, there may be lines (e.g., 1017) or some other visual indication connecting a user (e.g., the user 1010) to the AR content item placed by the user (e.g., the AR content item 1015).

In particular embodiments, users interacting with an AR environment may view and interact with AR content in the AR environment. In particular embodiments, a user may interact with an AR environment even if the user is not physically present in a real-world environment that corresponds to the AR environment. As an example and not by way of limitation, a user may remotely access an AR environment (e.g., via a virtual-reality device, or via an AR device) and may view and interact with the AR environment and its AR contents.

Figure 12:
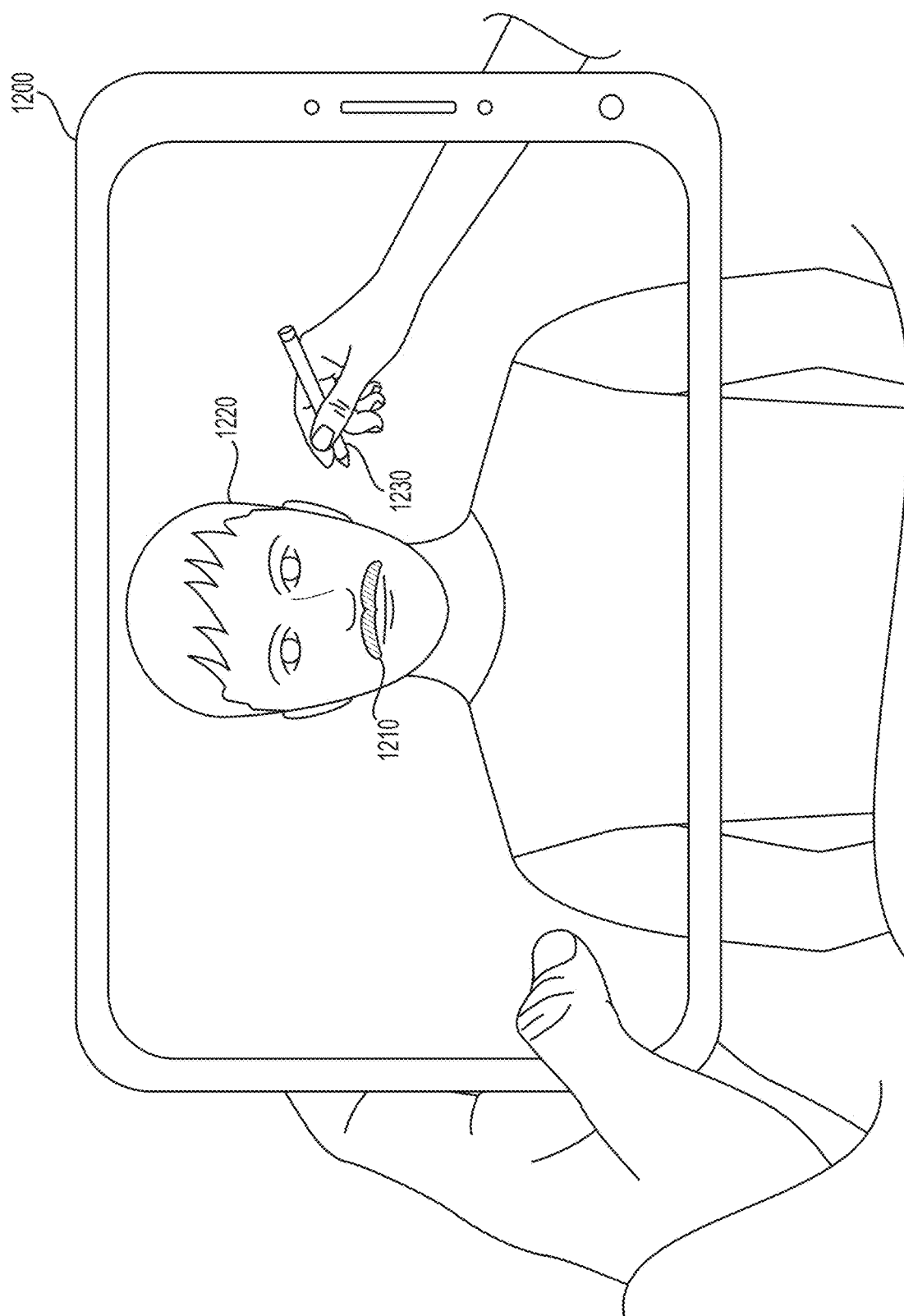
FIG. 12 illustrates an example of an AR mustache being drawn on a face detected in an AR environment.

FIG. 12 illustrates an example of an AR mustache being drawn on a face detected in an AR environment. In particular embodiments, an AR content item may be persistent for one or more periods of time. In particular embodiments, the AR content item may remain associated with a particular location within the AR space, and may persist at that location. As an example and not by way of limitation, an AR content item may persist at a particular coordinate point within a coordinate space associated with an AR environment. In particular embodiments, the location may be determined with respect to other objects (e.g., a table) detected within the AR environment. In particular embodiments, the location may be a floating location that is based on the location of another object (e.g., a face). As an example and not by way of limitation, referencing FIG. 12, a mustache 1210 drawn by a first user (e.g., a user holding the device 1200 on a face 1220 of a second user (e.g., another user within the AR environment) with a stylus device 1230, and this mustache may persist on the second user's face 1220 for a predefined time period (e.g., five minutes) even if the second user moves around. As another example and not by way of limitation, the mustache may appear on the second user during multiple predefined time periods—e.g., whenever the user is interacting with the AR environment after 5 p.m. In particular embodiments, the predefined time periods for persistence may be defined by users (e.g., a user who created or placed the AR content item in the AR environment) or set by default by an associated AR application. In particular embodiments, the one or more time periods may be determined based on information associated with a real-world location associated with the AR environment (e.g., an event that is scheduled to occur at the location). As an example and not by way of limitation, in an AR environment that corresponds to a real-world venue, whenever a concert is occurring or about to occur at the venue, associated elements may appear (e.g., thematic elements such as posters, a virtual guitar object). When a standup comedy show is occurring or about to occur at the same venue, other associated elements may appear (e.g., information about the performing comedians). As another example and not by way of limitation, an AR restaurant corresponding to a restaurant may show a lunch menu at lunch time and a dinner menu at dinner time (e.g., when a user views a real-world menu through the display of an AR device). As another example and not by way of limitation, an AR environment may change thematically based on the time of year (e.g., incorporating summer-related elements in the summer, winter-related elements in winter, Valentine's Day-related elements on Valentine's day).

In particular embodiments, AR content in an AR environment may be personalized for a user (or a group of users) based on information associated with the user (or group of users). As an example and not by way of limitation, an AR environment may include placeholder elements that allow for customized content to be displayed within the environment based on the user who is viewing the AR environment. For example, an AR environment corresponding to a hotel room may include placeholder elements associated with real-world picture frames, such that pictures associated with a hotel guest viewing the picture frames in the AR environment may see photos associated with the hotel guest (e.g., photos uploaded by the hotel guest to an online social network, photos that reside locally on a computing device of the hotel guest, etc.).

In particular embodiments, the AR content item may persist indefinitely until an event occurs to remove the AR content item. As an example and not by way of limitation, a mustache drawn on a user's face may remain on the user's face indefinitely until the user submits an input to remove the mustache (e.g., a gesture using a computing device or an associated controller to "wipe away" the mustache).

In particular embodiments, a user viewing an AR environment may interact with content within the AR environment. As an example and not by way of limitation, a user may be able to modify an AR content item as discussed in further detail elsewhere herein. In particular embodiments, the user may submit a content-selection input using a computing device (e.g., one that is displaying the AR environment to the user) that selects a particular AR content in the AR environment. This may enable the computing device to interact with the AR content item. A content selection input may be performed by any suitable means of input (e.g., a touch gesture such as a tap, a hand gesture, pressing a button on a controller). In particular embodiments, an interaction may involve moving an AR content item from one location to another within an AR environment. As an example and not by way of limitation, a user may move a virtual object within the AR environment to a different location. In particular embodiments, an interaction may involve performing a content-specific action with the AR content item. As an example and not by way of limitation, a user may play a game with an AR bowling ball, by picking it up and throwing it at a set of AR bowling pins. In particular embodiments, an interaction may involve magnifying the AR content item or otherwise viewing the AR content item. As an example and not by way of limitation, referencing FIG. 10, a user may submit a content-selection input associated with the AR content item 1015 (e.g., by tapping on it). In response, a magnified version of the AR content item 1015 may be displayed on a computing device of the user. As another example and not by way of limitation, referencing FIG. 10, a user may tap on the AR content item 1025, which may be a video. In response, the associated video may begin playing.

In particular embodiments, a first user who accesses an AR content item in an AR environment may be in the same real-world environment as a second user who is placing or has placed the AR content item within the AR environment. In these embodiments, the AR content item may have been placed by the second user at a prior time-point by the second user. For example, the second user may have placed a photo in the AR environment a year ago when the second user was last in the corresponding real-world environment. In this example, the first user may see the photo today when the first user visits the real-world environment and views the corresponding AR environment. Alternatively in these embodiments, the AR content item may be placed while the first user is in the real-world environment with the second user. As an example and not by way of limitation, the first user may watch the second user place a photo in an AR environment in real-time when they are both present in a corresponding real-world environment.

In particular embodiments, a first user who accesses an AR content item in an AR environment may be in a different real-world environment than a second user who is placing or has placed the AR content item within the AR environment. In these embodiments, the AR content item may have been placed by the second user at a prior time-point by the second user. For example, the second user may have placed a photo in the AR environment a year ago when the second user was last in the AR environment, which may have been accessed remotely (e.g., via a VR device). In this example, the first user may see the photo today when the first user visits the corresponding real-world environment and views the corresponding AR environment. Alternatively in these embodiments, the AR content item may be placed while both users are accessing the AR environment. As an example and not by way of limitation, the first user may watch the second user place a photo in an AR environment in real-time when they are both accessing the AR environment.

In particular embodiments, the AR content item may be configured to vary in appearance based on detected lighting and color settings of the AR environment and further based on the location of the AR content item within the AR environment. This varying may emulate the variance that occurs in real-world objects within a real-world environment, as light is absorbed and reflected off of the real-world objects. This feature may be beneficial to incorporate into AR content in the AR environment, because it may further reinforce the perception that the AR content item is integrated into the real-world environment, or at least that it is influenced by the real-world environment. In particular embodiments, the color, shading, and/or texture of an AR content item may be dynamically altered. As an example and not by way of limitation, the color and shading of the AR content item may vary automatically as it is moved to different locations of the AR environment it inhabits. For example, if it is moved near a light source that is pink in color, portions of the AR content item may take on a pinkish hue (e.g., with the hue of pink being strongest near the light source and gradually attenuating as it gets farther away from the light source). The AR content item's appearance may also vary based on the perspective of the user viewing the AR content item. As an example and not by way of limitation, the shading of an AR content item may change based on whether the user views it from the left of a real-world window that is projecting light into the real-world environment (and the corresponding AR environment) or from the right of the real-world window.

Figure 13:
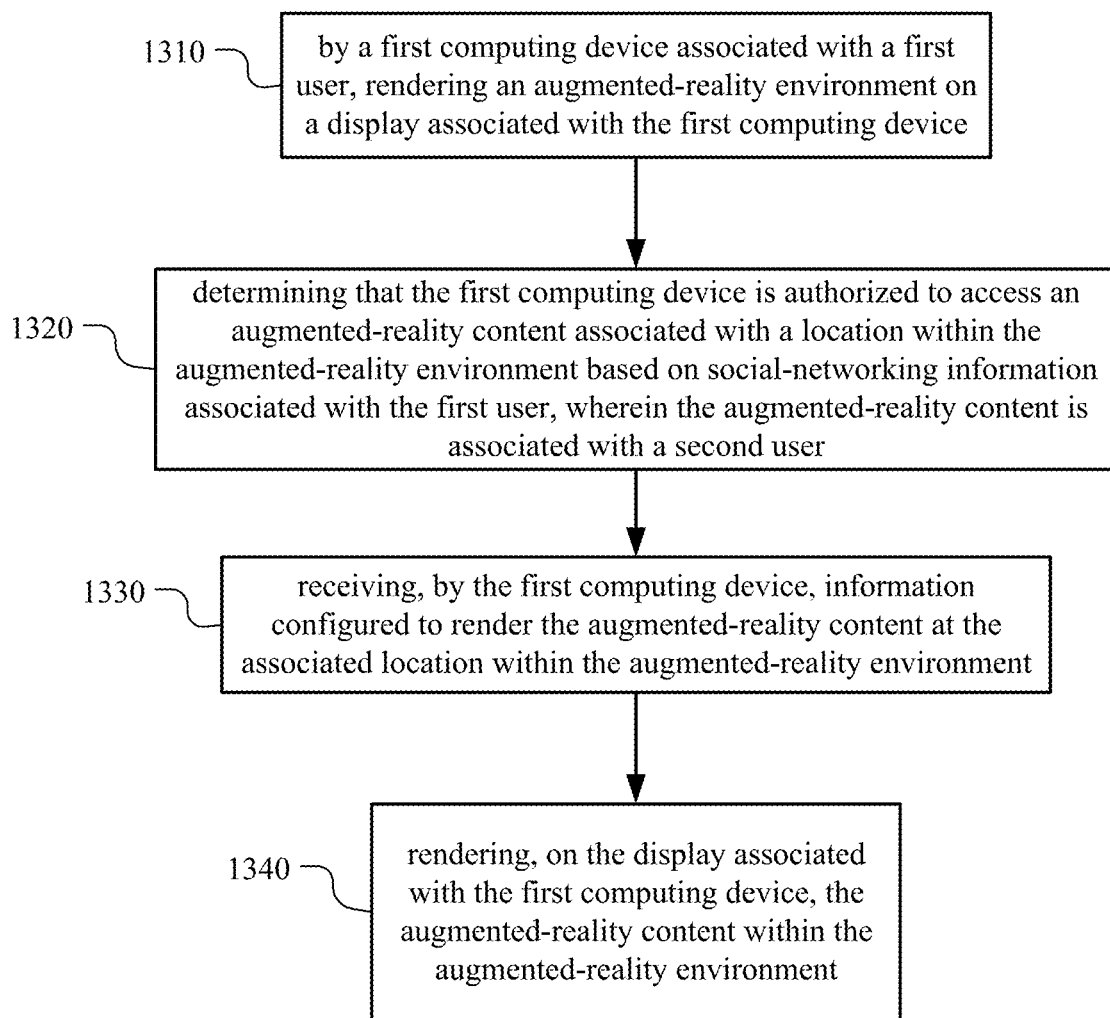
FIG. 13 illustrates an example method for rendering, on a computing device of a first user, an AR content item placed by a second user within an AR environment.

FIG. 13 illustrates an example method 1300 for rendering, on a computing device of a first user, an AR content item placed by a second user within an AR environment. The method may begin at step 1310, where a first computing device associated with a first user may render an AR environment on a display associated with the first computing device. At step 1320, a computing system (e.g., a server computing machine, the first computing device) may determine that the first computing device is authorized to access an AR content item associated with a location within the AR environment based on social-networking information associated with the first user, wherein the AR content item is associated with a second user. At step 1330, the first computing device may receive information configured to render the AR content item at the associated location within the AR environment. At step 1340, the AR content item may be rendered within the AR environment on a display associated with the first computing device. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. In particular embodiments, any suitable combination of steps may occur in parallel. Moreover, although this disclosure describes and illustrates an example method for rendering, on a computing device of a first user, an AR content item placed by a second user within an AR environment including the particular steps of the method of FIG. 13, this disclosure contemplates any suitable method for rendering, on a computing device of a first user, an AR content item placed by a second user within an AR environment including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Suggestion of Content

In particular embodiments, an AR environment may be rendered. In particular embodiments, one or more objects (e.g., a face, an animal, a real-world inanimate object, a virtual object, etc.) may be identified within an AR environment rendered on a display associated with a first computing device associated with a first user. In particular embodiments, the objects may be identified using any suitable methods such as the tracking algorithms disclosed herein (e.g., SLAM, region tracking, face tracking). In particular embodiments, the objects may be identified locally by the computing device on which an AR environment may be rendered (e.g., the first computing device). In particular embodiments, the objects may be identified by a remote server (e.g., a remote server associated with an online social network). As an example and not by way of limitation, image information captured at the first computing device may be sent to a remote server, which may identify objects in the images and send information to the first computing device identifying the objects. In particular embodiments, the processing tasks/resources may be divided among multiple computing devices. As an example and not by way of limitation, the first computing device may work in conjunction with a remote server (or a second computing device) to identify objects in the AR environment.

Figure 14:
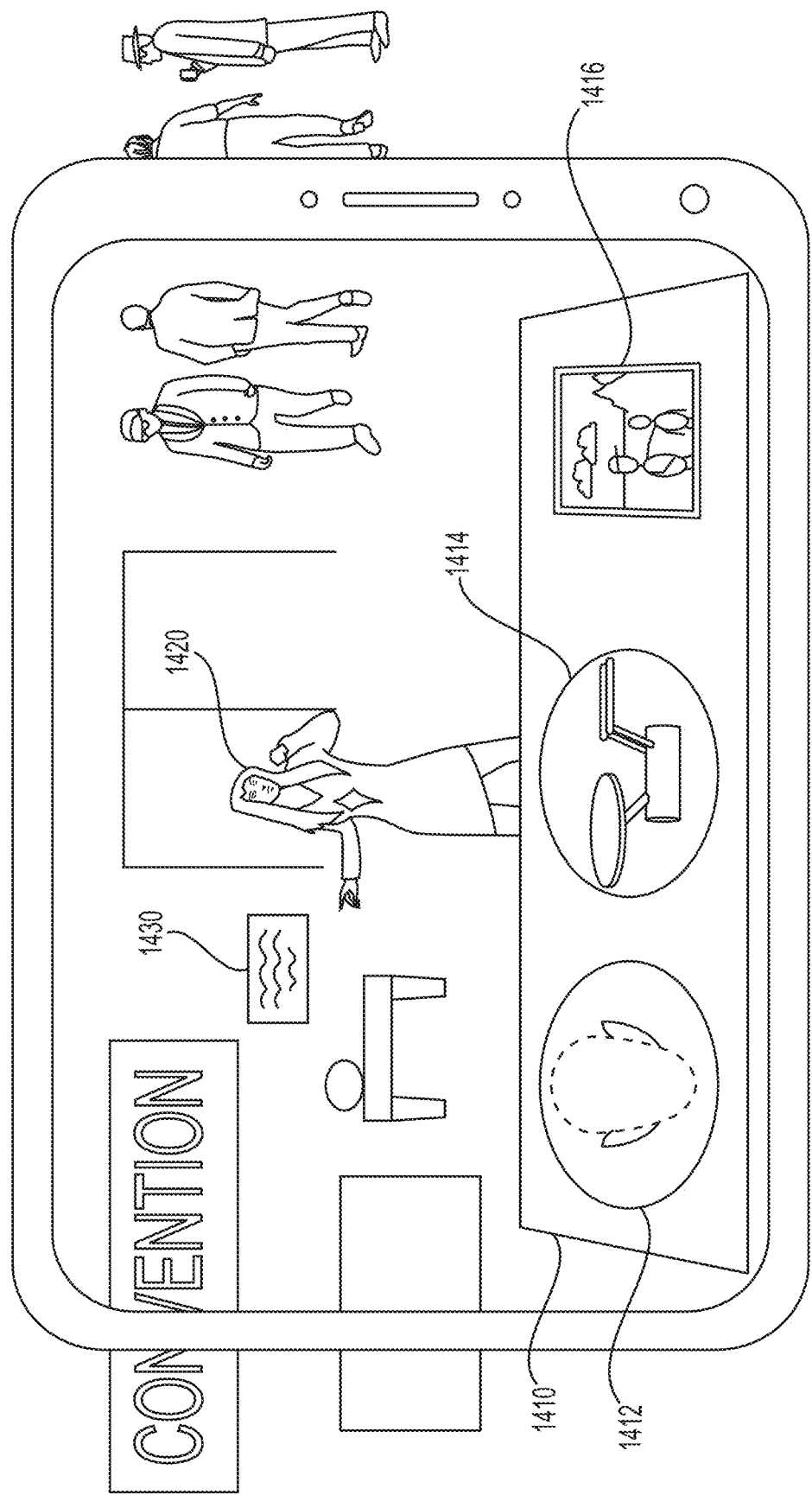
FIG. 14 illustrates an example of a view of AR environment that includes suggested AR content.

FIG. 14 illustrates an example of a view of AR environment that includes suggested AR content. In particular embodiments, a computing system may determine one or more suggested AR content items for the first user. In particular embodiments, the computing system may be a client computing device (e.g., the first computing device) or a remote server. The suggested AR content item may be an AR content item from a subset of AR content items that are accessible to the first user (e.g., content with privacy settings that allow the first user to access the content).

In particular embodiments, determining the suggested AR content item may involve calculating a score for each of a subset of AR content items (e.g., content that is accessible to the first user. In particular embodiments, the computing system may access a data store that includes AR content. As an example and not by way of limitation, the data store may be a local data store of a client computing device (e.g., the first computing device) or a data store of a remote server (e.g., a data store associated with an online social network). In particular embodiments, the AR content item within this data store may be associated with one or more users. As an example and not by way of limitation, an AR content item may be associated with one or more users who created, uploaded, or modified the AR content item. In particular embodiments, a score may be calculated (e.g., by the first computing device or by a server associated with the data store) for each AR content item or for a subset of the AR content item (e.g., AR content items that are determined to be accessible to the first user). score may be based on any suitable factor, such as those disclosed herein. As an example and not by way of limitation, the score may be based on characteristics associated with the identified objects and the social-networking information associated with the first user. In particular embodiments, the computing system may determine the suggested AR content item based on respective scores of each AR content item in the data store (or in the subset of AR content). In particular embodiments, the computing system may suggest AR content items that have a score greater than a threshold score. In particular embodiments, the computing system may suggest AR content items that are ranked (based on their scores) higher than a threshold rank. As an example and not by way of limitation, the computing system may determine that the top three AR content items are to be suggested AR content items.

In particular embodiments, the determination as to what content to suggest may be based on social-networking information associated with the first user. In particular embodiments, the suggested AR content item may be determined based on the first user's social-graph affinities (e.g., based on calculated affinity coefficients). As an example and not by way of limitation, a virtual object in the shape of a coffee mug may receive a higher score if a first user who has a relatively high affinity coefficient for coffee than otherwise. In particular embodiments, the suggested AR content item may be determined based on demographic information associated with the first user. As an example and not by way of limitation, if the first user is 25 years old, an AR content item that includes a slang term used by 20-30-year-olds may receive a higher score than otherwise. For example, an emoji with the term "bae" (slang for a person's significant other) may receive a higher score for a 20-year-old person than a 70-year-old person, all else equal. In particular embodiments, the suggested AR content item may be determined based on one or more languages associated with the first user (e.g., languages used by the first user in communications on an online social network, languages specified in the first user's profile information). As an example and not by way of limitation, if the first user frequently makes social-network posts in Arabic, an AR content item that includes Arabic (or an AR content item that is in some other way associated with the Arabic language) may receive a higher score than otherwise.

In particular embodiments, the determination as to what content to suggest may be based on characteristics associated with the objects identified in the AR environment. In particular embodiments, certain objects may have characteristics that cause them to be associated with certain AR content items or categories of AR content items. As an example and not by way of limitation, an AR hat (e.g., a baseball cap that can be affixed to a user's head in an AR environment) may receive a higher score for objects that are identified as faces than objects that are identified as books. As an example and not by way of limitation, the identified objects may be determined to be associated with Star Wars, in which case AR content items associated with Star Wars may receive a higher score than AR content items associated with Star Trek.

In particular embodiments, one characteristic of an identified object may be its association with a particular second user. In these embodiments, the score of an AR content item may be based on information associated with the particular second user. As an example and not by way of limitation, the identified object may be a face of the second user. In this example, if the second user is determined to be a close friend of the first user, a mustache filter may receive a higher score than if the second user is determined to be a business acquaintance (e.g., because the first user's relationship with the latter may be too formal for the first user to find an AR mustache useful). As an example and not by way of limitation, if the second user is determined to be the first user's spouse, an AR emoji in the shape of a heart may receive a relatively high score.

In particular embodiments, the determination as to what content to suggest may be based on characteristics associated with the suggested AR content item. One such characteristic of an AR content item may be its association with a particular second user. In particular embodiments, a second user may be associated with an AR content item if the second user was involved in creating, uploading, or modifying the AR content item. In particular embodiments, the score of an AR content item may be based on a degree of separation between the first user and the second user (e.g., on a social graph of an online social network). As an example and not by way of limitation, the suggested AR content item may have been created by the second user. For example, the suggested AR content item may be a mask or a drawing created by a friend of the user (e.g., a social-network connection of the first user). In this example, this AR content item may receive a higher score than otherwise because of this characteristic.

In particular embodiments, the suggested AR content item may be determined based on a current location of the first user and a characteristic associated with the suggested AR content item (e.g., location information associated with the AR content item). As an example and not by way of limitation, an AR content item that was created, uploaded, or modified at the current location may receive a higher score than otherwise. For example the first user may be more likely to receive filters or photos that were created in San Francisco if the first user were in San Francisco than otherwise. As another example and not by way of limitation, an AR content item that may be associated with the current location may receive a higher score than otherwise. For example, the first user may be more likely to receive an AR content item such as an article about the Eiffel Tower when the first user is near the Eiffel Tower than otherwise. As another example and not by way of limitation, a particular AR content item may include makes a cultural reference that may be relevant to users in a first geographical region and may not be understood by users of a second geographical region. In this example, the particular AR content item may receive a higher score for a user who lives in the first geographical region than for a user who lives in the second geographical region, all else equal.

In particular embodiments, the suggested AR content item may be determined based on an event associated with an AR environment. In particular embodiments, the event may be determined to be occurring currently. As an example and not by way of limitation, referencing FIG. 14, a computing system may determine that the AR environment being rendered on the client computing device 1400 of the first user may be associated with a Star Trek Convention. In particular embodiments, this determination may be based on a predetermined schedule (e.g., as determined by a calendar of the first user associated with the client computing device 1400, as determined by a calendar of events in an area, etc.) and/or the location of the first user. For example, the first user may be determined to be located at a particular convention center (e.g., by way of a GPS associated with the client computing device 1400) that is hosting a Star Trek Convention at a current time. In particular embodiments, information a plurality of users and information about a common location may be used to determine that the first user is at a particular event. As an example and not by way of limitation, a computing system may determine that the first user is attending a birthday party of a second user if the first user and several of the second user's friends (e.g., as determined based on social-graph information) are at the second user's house, and if it is the second user's birthday (e.g., as determined based on profile information of the second user). In particular embodiments, the first user may be determined to be at a particular event based on objects detected in the AR environment. As an example and not by way of limitation, the object 1430 may be a poster associated with a Star Trek Convention, which may make it likely that the first user is at a Star Trek Convention. Referencing FIG. 14, when it is determined that the first user is at a Star Trek Convention, the AR content item 1412, 1414, and 1416 may receive relatively high scores at least in part because they are associated with Star Trek.

In particular embodiments, the suggested AR content item may be determined based on a current date or time, independent of any particular event. As an example and not by way of limitation, AR content items such as Halloween masks may receive a higher score when it is Halloween than otherwise.

In particular embodiments, the suggested AR content item may be presented as suggestions on a display associated with the first computing device. In particular embodiments, these suggestions may be displayed within a suggestions interface that may be rendered takes up a sub-region of the display associated with the first computing device. As an example and not by way of limitation, referencing FIG. 14, the suggestions interface 1410 may be displayed on a computing device of a first user. In this example, the first user may be presented with three suggested AR content items (e.g., the ears 1412, the spaceship object 1414, and the photo 1416). In particular embodiments, a first user viewing the display may be able to inspect and select one or more of the suggested AR content item. In particular embodiments, the first user may be able to place the suggested AR content item within the AR environment.

In particular embodiments, the identified objects that are used as a basis to determine the suggested AR content item may be objects within the AR environment that are determined to be of current interest to the first user. In particular embodiments, an object may be determined to be of current interest to the first user if it appears within a focal region of the display associated with the first computing device. As an example and not by way of limitation, when an object identified as a face appears within a focal region, an AR mustache may receive a higher score than an AR photo, all else equal. In particular embodiments, the focal region of the display may be center of the display, a region around a reticle displayed on the display, or a predicted focus of the first user's gaze (e.g., as determined by a camera or other sensor that may track the first user's head orientation or pupils). More information about determining focal regions being used to determine an object of interest within an environment may be found in U.S. patent application Ser. No. 15/722,437, filed 2 Oct. 2017, which is incorporated herein by reference.

In particular embodiments, the first user may modify an identified object in the AR environment with a suggested AR content item. As an example and not by way of limitation, referencing FIG. 14, the AR content item may be a mask such as the ears 1412, which the first user may place on a face 1420 of a user within the AR environment. In this example, the ears 1412 may persist on the face 1420 of the user for one or more periods of time, or indefinitely until an event occurs (as disclosed elsewhere herein). As an example and not by way of limitation, the AR content item may be Halloween filter. In this example, an entire AR environment may be modified such that it becomes Halloween themed.

In particular embodiments, the first user may modify a suggested AR content item (or any AR content, whether or not it has been suggested), or an instance thereof. As an example and not by way of limitation, the first user may draw on the AR content item (e.g., drawing a hat on a suggested emoji sticker), resize the content, crop the content, rotate the content, or alter it in any suitable way.

In particular embodiments, a user may create or modify an AR content item (e.g., a suggested AR content item) and upload it to a server. In particular embodiments, modifying an AR content item may involve creating a new instance of the AR content item and modifying that newly created instance, such that the original AR content item may remain unmodified. In particular embodiments, modifying an AR content item may involve modifying the original AR content. In these embodiments, the user modifying the AR content item may be required to be authorized to make the modification (e.g., the user may have created the AR content item or been given access to modify by a user who created the AR content item). In particular embodiments, a user who uploads AR content items to the server may specify privacy settings for the AR content item. The privacy settings may specify criteria that may be used to determine users who may be authorized to access or modify the uploaded AR content. In particular embodiments, users who have access to the content items may be able to search for and select the uploaded AR content. In particular embodiments, as disclosed elsewhere herein, this user-uploaded AR content may be automatically suggested to users (e.g., within a suggestions interface).

Figure 15:
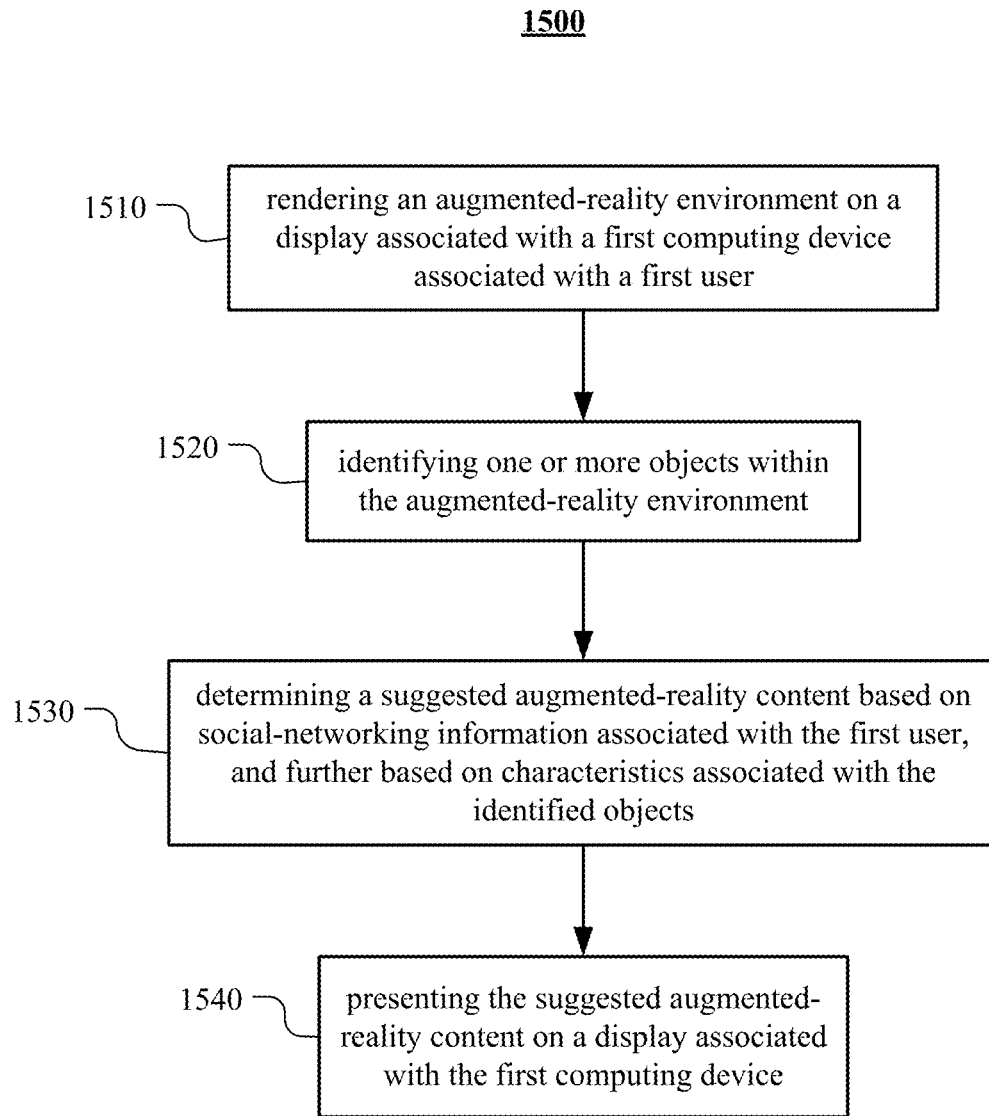
FIG. 15 illustrates an example method for suggesting an AR content item to a user.

FIG. 15 illustrates an example method 1500 for suggesting an AR content item to a user. The method may begin at step 1510, where an AR environment may be rendered on a display associated with a first computing device associated with a first user. At step 1520, one or more objects may be identified within the AR environment. At step 1530, a suggested AR content item may be determined based on social-networking information associated with the first user, and further based on characteristics associated with the identified objects. At step 1540, the suggested AR content item may be presented on a display associated with the first computing device. Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order. In particular embodiments, any suitable combination of steps may occur in parallel. Moreover, although this disclosure describes and illustrates an example method for suggesting an AR content item to a user including the particular steps of the method of FIG. 15, this disclosure contemplates any suitable method for suggesting an AR content item to a user including any suitable steps, which may include all, some, or none of the steps of the method of FIG. 15, where appropriate. Furthermore, although this disclosure describes and illustrates particular components, devices, or systems carrying out particular steps of the method of FIG. 15, this disclosure contemplates any suitable combination of any suitable components, devices, or systems carrying out any suitable steps of the method of FIG. 15.

System Overview

Figure 16:
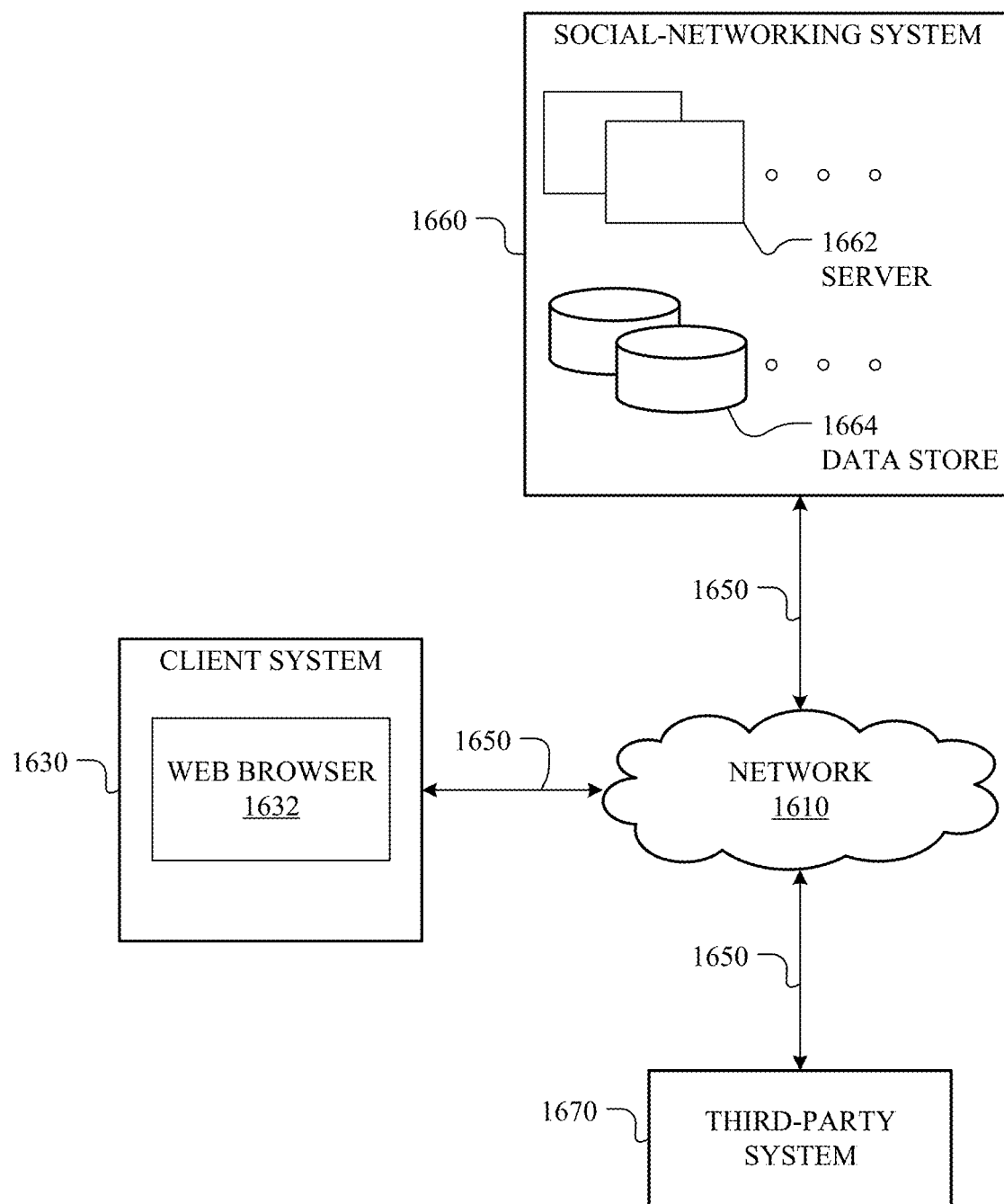
FIG. 16 illustrates an example network environment associated with a social-networking system.

FIG. 16 illustrates an example network environment 1600 associated with a social-networking system. Network environment 1600 includes a client system 1630, a social-networking system 1660, and a third-party system 1670 connected to each other by a network 1610. Although FIG. 16 illustrates a particular arrangement of client system 1630, social-networking system 1660, third-party system 1670, and network 1610, this disclosure contemplates any suitable arrangement of client system 1630, social-networking system 1660, third-party system 1670, and network 1610. As an example and not by way of limitation, two or more of client system 1630, social-networking system 1660, and third-party system 1670 may be connected to each other directly, bypassing network 1610. As another example, two or more of client system 1630, social-networking system 1660, and third-party system 1670 may be physically or logically co-located with each other in whole or in part. Moreover, although FIG. 16 illustrates a particular number of client systems 1630, social-networking systems 1660, third-party systems 1670, and networks 1610, this disclosure contemplates any suitable number of client systems 1630, social-networking systems 1660, third-party systems 1670, and networks 1610. As an example and not by way of limitation, network environment 1600 may include multiple client system 1630, social-networking systems 1660, third-party systems 1670, and networks 1610.

This disclosure contemplates any suitable network 1610. As an example and not by way of limitation, one or more portions of network 1610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1610 may include one or more networks 1610.

Links 1650 may connect client system 1630, social-networking system 1660, and third-party system 1670 to communication network 1610 or to each other. This disclosure contemplates any suitable links 1650. In particular embodiments, one or more links 1650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1650, or a combination of two or more such links 1650. Links 1650 need not necessarily be the same throughout network environment 1600. One or more first links 1650 may differ in one or more respects from one or more second links 1650.

In particular embodiments, client system 1630 may be an electronic device including hardware, software, or embedded logic components or a combination of two or more such components and capable of carrying out the appropriate functionalities implemented or supported by client system 1630. As an example and not by way of limitation, a client system 1630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1630. A client system 1630 may enable a network user at client system 1630 to access network 1610.

A client system 1630 may enable its user to communicate with other users at other client systems 1630.

In particular embodiments, client system 1630 may include a web browser 1632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1630 may enter a Uniform Resource Locator (URL) or other address directing the web browser 1632 to a particular server (such as server 1662, or a server associated with a third-party system 1670), and the web browser 1632 may generate a Hyper Text Transfer Protocol (HTTP) request and communicate the HTTP request to server. The server may accept the HTTP request and communicate to client system 1630 one or more Hyper Text Markup Language (HTML) files responsive to the HTTP request. Client system 1630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1660 may be a network-addressable computing system that can host an online social network. Social-networking system 1660 may generate, store, receive, and send social-networking data, such as, for example, user-profile data, concept-profile data, social-graph information, or other suitable data related to the online social network. Social-networking system 1660 may be accessed by the other components of network environment 1600 either directly or via network 1610. As an example and not by way of limitation, client system 1630 may access social-networking system 1660 using a web browser 1632, or a native application associated with social-networking system 1660 (e.g., a mobile social-networking application, a messaging application, another suitable application, or any combination thereof) either directly or via network 1610. In particular embodiments, social-networking system 1660 may include one or more servers 1662. Each server 1662 may be a unitary server or a distributed server spanning multiple computers or multiple datacenters. Servers 1662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1662 may include hardware, software, or embedded logic components or a combination of two or more such components for carrying out the appropriate functionalities implemented or supported by server 1662. In particular embodiments, social-networking system 1660 may include one or more data stores 1664. Data stores 1664 may be used to store various types of information. In particular embodiments, the information stored in data stores 1664 may be organized according to specific data structures. In particular embodiments, each data store 1664 may be a relational, columnar, correlation, or other suitable database. Although this disclosure describes or illustrates particular types of databases, this disclosure contemplates any suitable types of databases. Particular embodiments may provide interfaces that enable a client system 1630, a social-networking system 1660, or a third-party system 1670 to manage, retrieve, modify, add, or delete, the information stored in data store 1664.

In particular embodiments, social-networking system 1660 may store one or more social graphs in one or more data stores 1664. In particular embodiments, a social graph may include multiple nodes—which may include multiple user nodes (each corresponding to a particular user) or multiple concept nodes (each corresponding to a particular concept)—and multiple edges connecting the nodes. Social-networking system 1660 may provide users of the online social network the ability to communicate and interact with other users. In particular embodiments, users may join the online social network via social-networking system 1660 and then add connections (e.g., relationships) to a number of other users of social-networking system 1660 to whom they want to be connected. Herein, the term "friend" may refer to any other user of social-networking system 1660 with whom a user has formed a connection, association, or relationship via social-networking system 1660.

In particular embodiments, social-networking system 1660 may provide users with the ability to take actions on various types of items or objects, supported by social-networking system 1660. As an example and not by way of limitation, the items and objects may include groups or social networks to which users of social-networking system 1660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1660 or by an external system of third-party system 1670, which is separate from social-networking system 1660 and coupled to social-networking system 1660 via a network 1610.

In particular embodiments, social-networking system 1660 may be capable of linking a variety of entities. As an example and not by way of limitation, social-networking system 1660 may enable users to interact with each other as well as receive content from third-party systems 1670 or other entities, or to allow users to interact with these entities through an application programming interfaces (API) or other communication channels.

In particular embodiments, a third-party system 1670 may include one or more types of servers, one or more data stores, one or more interfaces, including but not limited to APIs, one or more web services, one or more content sources, one or more networks, or any other suitable components, e.g., that servers may communicate with. A third-party system 1670 may be operated by a different entity from an entity operating social-networking system 1660. In particular embodiments, however, social-networking system 1660 and third-party systems 1670 may operate in conjunction with each other to provide social-networking services to users of social-networking system 1660 or third-party systems 1670. In this sense, social-networking system 1660 may provide a platform, or backbone, which other systems, such as third-party systems 1670, may use to provide social-networking services and functionality to users across the Internet.

In particular embodiments, a third-party system 1670 may include a third-party content object provider. A third-party content object provider may include one or more sources of content objects, which may be communicated to a client system 1630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1660 also includes user-generated content objects, which may enhance a user's interactions with social-networking system 1660. User-generated content may include anything a user can add, upload, send, or "post" to social-networking system 1660. As an example and not by way of limitation, a user communicates posts to social-networking system 1660 from a client system 1630. Posts may include data such as status updates or other textual data, location information, photos, videos, links, music or other similar data or media. Content may also be added to social-networking system 1660 by a third-party through a "communication channel," such as a newsfeed or stream.

In particular embodiments, social-networking system 1660 may include a variety of servers, sub-systems, programs, modules, logs, and data stores. In particular embodiments, social-networking system 1660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1660 may also include suitable components such as network interfaces, security mechanisms, load balancers, failover servers, management-and-network-operations consoles, other suitable components, or any suitable combination thereof. In particular embodiments, social-networking system 1660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1660 to one or more client systems 1630 or one or more third-party system 1670 via network 1610. The web server may include a mail server or other messaging functionality for receiving and routing messages between social-networking system 1660 and one or more client systems 1630. An API-request server may allow a third-party system 1670 to access information from social-networking system 1660 by calling one or more APIs.

An action logger may be used to receive communications from a web server about a user's actions on or off social-networking system 1660. In conjunction with the action log, a third-party-content-object log may be maintained of user exposures to third-party-content objects. A notification controller may provide information regarding content objects to a client system 1630. Information may be pushed to a client system 1630 as notifications, or information may be pulled from client system 1630 responsive to a request received from client system 1630. Authorization servers may be used to enforce one or more privacy settings of the users of social-networking system 1660. A privacy setting of a user determines how particular information associated with a user can be shared. The authorization server may allow users to opt in to or opt out of having their actions logged by social-networking system 1660 or shared with other systems (e.g., third-party system 1670), such as, for example, by setting appropriate privacy settings. Third-party-content-object stores may be used to store content objects received from third parties, such as a third-party system 1670. Location stores may be used for storing location information received from client systems 1630 associated with users. Advertisement-pricing modules may combine social information, the current time, location information, or other suitable information to provide relevant advertisements, in the form of notifications, to a user.

Social Graphs

Figure 17:
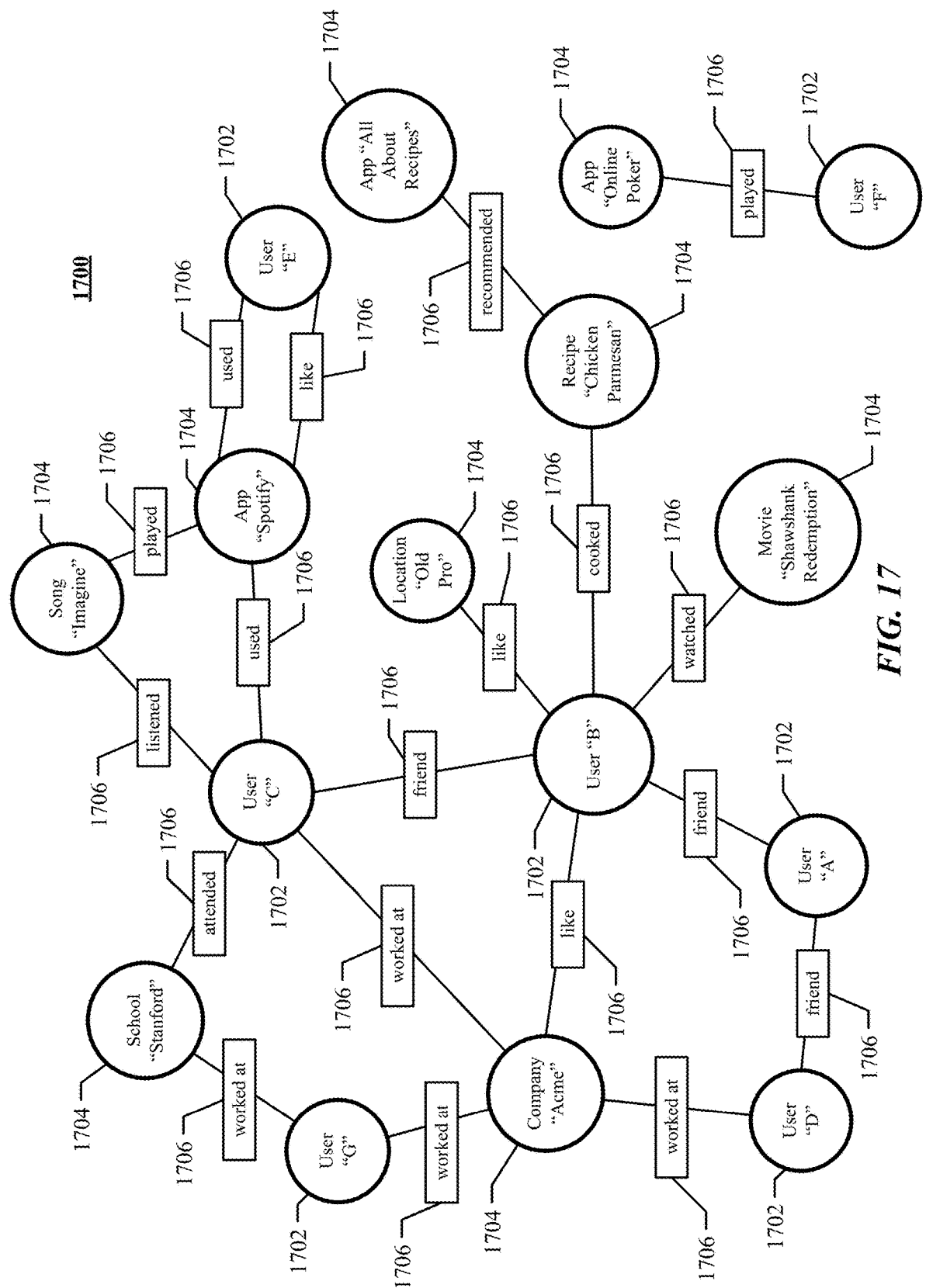
FIG. 17 illustrates an example social graph.

FIG. 17 illustrates example social graph 1700. In particular embodiments, social-networking system 1660 may store one or more social graphs 1700 in one or more data stores. In particular embodiments, social graph 1700 may include multiple nodes—which may include multiple user nodes 1702 or multiple concept nodes 1704—and multiple edges 1706 connecting the nodes. Each node may be associated with a unique entity (i.e., user or concept), each of which may have a unique identifier (ID), such as a unique number or username. Example social graph 1700 illustrated in FIG. 17 is shown, for didactic purposes, in a two-dimensional visual map representation. In particular embodiments, a social-networking system 1660, client system 1630, or third-party system 1670 may access social graph 1700 and related social-graph information for suitable applications. The nodes and edges of social graph 1700 may be stored as data objects, for example, in a data store (such as a social-graph database). Such a data store may include one or more searchable or queryable indexes of nodes or edges of social graph 1700.

In particular embodiments, a user node 1702 may correspond to a user of social-networking system 1660. As an example and not by way of limitation, a user may be an individual (human user), an entity (e.g., an enterprise, business, or third-party application), or a group (e.g., of individuals or entities) that interacts or communicates with or over social-networking system 1660. In particular embodiments, when a user registers for an account with social-networking system 1660, social-networking system 1660 may create a user node 1702 corresponding to the user, and store the user node 1702 in one or more data stores. Users and user nodes 1702 described herein may, where appropriate, refer to registered users and user nodes 1702 associated with registered users. In addition or as an alternative, users and user nodes 1702 described herein may, where appropriate, refer to users that have not registered with social-networking system 1660. In particular embodiments, a user node 1702 may be associated with information provided by a user or information gathered by various systems, including social-networking system 1660. As an example and not by way of limitation, a user may provide his or her name, profile picture, contact information, birth date, sex, marital status, family status, employment, education background, preferences, interests, or other demographic information. In particular embodiments, a user node 1702 may be associated with one or more data objects corresponding to information associated with a user. In particular embodiments, a user node 1702 may correspond to one or more webpages.

In particular embodiments, a concept node 1704 may correspond to a concept. As an example and not by way of limitation, a concept may correspond to a place (such as, for example, a movie theater, restaurant, landmark, or city); a website (such as, for example, a website associated with social-network system 1660 or a third-party website associated with a web-application server); an entity (such as, for example, a person, business, group, sports team, or celebrity); a resource (such as, for example, an audio file, video file, digital photo, text file, structured document, or application) which may be located within social-networking system 1660 or on an external server, such as a web-application server; real or intellectual property (such as, for example, a sculpture, painting, movie, game, song, idea, photograph, or written work); a game; an activity; an idea or theory; an object in an augmented/virtual reality environment; another suitable concept; or two or more such concepts. A concept node 1704 may be associated with information of a concept provided by a user or information gathered by various systems, including social-networking system 1660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1704 may be associated with one or more data objects corresponding to information associated with concept node 1704. In particular embodiments, a concept node 1704 may correspond to one or more webpages.

In particular embodiments, a node in social graph 1700 may represent or be represented by a webpage (which may be referred to as a "profile page"). Profile pages may be hosted by or accessible to social-networking system 1660. Profile pages may also be hosted on third-party websites associated with a third-party system 1670. As an example and not by way of limitation, a profile page corresponding to a particular external webpage may be the particular external webpage and the profile page may correspond to a particular concept node 1704. Profile pages may be viewable by all or a selected subset of other users. As an example and not by way of limitation, a user node 1702 may have a corresponding user-profile page in which the corresponding user may add content, make declarations, or otherwise express himself or herself. As another example and not by way of limitation, a concept node 1704 may have a corresponding concept-profile page in which one or more users may add content, make declarations, or express themselves, particularly in relation to the concept corresponding to concept node 1704.

In particular embodiments, a concept node 1704 may represent a third-party webpage or resource hosted by a third-party system 1670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 1630 to send to social-networking system 1660 a message indicating the user's action. In response to the message, social-networking system 1660 may create an edge (e.g., a check-in-type edge) between a user node 1702 corresponding to the user and a concept node 1704 corresponding to the third-party webpage or resource and store edge 1706 in one or more data stores.

In particular embodiments, a pair of nodes in social graph 1700 may be connected to each other by one or more edges 1706. An edge 1706 connecting a pair of nodes may represent a relationship between the pair of nodes. In particular embodiments, an edge 1706 may include or represent one or more data objects or attributes corresponding to the relationship between a pair of nodes. As an example and not by way of limitation, a first user may indicate that a second user is a "friend" of the first user. In response to this indication, social-networking system 1660 may send a "friend request" to the second user. If the second user confirms the "friend request," social-networking system 1660 may create an edge 1706 connecting the first user's user node 1702 to the second user's user node 1702 in social graph 1700 and store edge 1706 as social-graph information in one or more of data stores 1664. In the example of FIG. 17, social graph 1700 includes an edge 1706 indicating a friend relation between user nodes 1702 of user "A" and user "B" and an edge indicating a friend relation between user nodes 1702 of user "C" and user "B." Although this disclosure describes or illustrates particular edges 1706 with particular attributes connecting particular user nodes 1702, this disclosure contemplates any suitable edges 1706 with any suitable attributes connecting user nodes 1702. As an example and not by way of limitation, an edge 1706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1700 by one or more edges 1706. The degree of separation between two objects represented by two nodes, respectively, is a count of edges in a shortest path connecting the two nodes in the social graph 1700. As an example and not by way of limitation, in the social graph 1700, the user node 1702 of user "C" is connected to the user node 1702 of user "A" via multiple paths including, for example, a first path directly passing through the user node 1702 of user "B," a second path passing through the concept node 1704 of company "Acme" and the user node 1702 of user "D," and a third path passing through the user nodes 1702 and concept nodes 1704 representing school "Stanford," user "G," company "Acme," and user "D." User "C" and user "A" have a degree of separation of two because the shortest path connecting their corresponding nodes (i.e., the first path) includes two edges 1706.

In particular embodiments, an edge 1706 between a user node 1702 and a concept node 1704 may represent a particular action or activity performed by a user associated with user node 1702 toward a concept associated with a concept node 1704. As an example and not by way of limitation, as illustrated in FIG. 17, a user may "like," "attended," "played," "listened," "cooked," "worked at," or "watched" a concept, each of which may correspond to an edge type or subtype. A concept-profile page corresponding to a concept node 1704 may include, for example, a selectable "check in" icon (such as, for example, a clickable "check in" icon) or a selectable "add to favorites" icon. Similarly, after a user clicks these icons, social-networking system 1660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 1660 may create a "listened" edge 1706 and a "used" edge (as illustrated in FIG. 17) between user nodes 1702 corresponding to the user and concept nodes 1704 corresponding to the song and application to indicate that the user listened to the song and used the application. Moreover, social-networking system 1660 may create a "played" edge 1706 (as illustrated in FIG. 17) between concept nodes 1704 corresponding to the song and the application to indicate that the particular song was played by the particular application. In this case, "played" edge 1706 corresponds to an action performed by an external application (SPOTIFY) on an external audio file (the song "Imagine"). Although this disclosure describes particular edges 1706 with particular attributes connecting user nodes 1702 and concept nodes 1704, this disclosure contemplates any suitable edges 1706 with any suitable attributes connecting user nodes 1702 and concept nodes 1704. Moreover, although this disclosure describes edges between a user node 1702 and a concept node 1704 representing a single relationship, this disclosure contemplates edges between a user node 1702 and a concept node 1704 representing one or more relationships. As an example and not by way of limitation, an edge 1706 may represent both that a user likes and has used at a particular concept. Alternatively, another edge 1706 may represent each type of relationship (or multiples of a single relationship) between a user node 1702 and a concept node 1704 (as illustrated in FIG. 17 between user node 1702 for user "E" and concept node 1704 for "SPOTIFY").

In particular embodiments, social-networking system 1660 may create an edge 1706 between a user node 1702 and a concept node 1704 in social graph 1700. As an example and not by way of limitation, a user viewing a concept-profile page (such as, for example, by using a web browser or a special-purpose application hosted by the user's client system 1630) may indicate that he or she likes the concept represented by the concept node 1704 by clicking or selecting a "Like" icon, which may cause the user's client system 1630 to send to social-networking system 1660 a message indicating the user's liking of the concept associated with the concept-profile page. In response to the message, social-networking system 1660 may create an edge 1706 between user node 1702 associated with the user and concept node 1704, as illustrated by "like" edge 1706 between the user and concept node 1704. In particular embodiments, social-networking system 1660 may store an edge 1706 in one or more data stores. In particular embodiments, an edge 1706 may be automatically formed by social-networking system 1660 in response to a particular user action. As an example and not by way of limitation, if a first user uploads a picture, watches a movie, or listens to a song, an edge 1706 may be formed between user node 1702 corresponding to the first user and concept nodes 1704 corresponding to those concepts. Although this disclosure describes forming particular edges 1706 in particular manners, this disclosure contemplates forming any suitable edges 1706 in any suitable manner.

Social Graph Affinity and Coefficient

In particular embodiments, social-networking system 1660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1660 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 1660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 1660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1660 may calculate a coefficient based on a user's actions. Social-networking system 1660 may monitor such actions on the online social network, on a third-party system 1670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 1660 may calculate a coefficient based on the user's actions with particular types of content. The content may be associated with the online social network, a third-party system 1670, or another suitable system. The content may include users, profile pages, posts, news stories, headlines, instant messages, chat room conversations, emails, advertisements, pictures, video, music, other suitable objects, or any combination thereof. Social-networking system 1660 may analyze a user's actions to determine whether one or more of the actions indicate an affinity for subject matter, content, other users, and so forth. As an example and not by way of limitation, if a user frequently posts content related to "coffee" or variants thereof, social-networking system 1660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1660 may calculate a coefficient based on the type of relationship between particular objects. Referencing the social graph 1700, social-networking system 1660 may analyze the number and/or type of edges 1706 connecting particular user nodes 1702 and concept nodes 1704 when calculating a coefficient. As an example and not by way of limitation, user nodes 1702 that are connected by a spouse-type edge (representing that the two users are married) may be assigned a higher coefficient than a user nodes 1702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 1660 may determine that the user has a higher coefficient with respect to the first photo than the second photo because having a tagged-in-type relationship with content may be assigned a higher weight and/or rating than having a like-type relationship with content. In particular embodiments, social-networking system 1660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1660 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1700. As an example and not by way of limitation, social-graph entities that are closer in the social graph 1700 (i.e., fewer degrees of separation) may have a higher coefficient than entities that are further apart in the social graph 1700.

In particular embodiments, social-networking system 1660 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 1630 of the user). A first user may be more interested in other users or concepts that are closer to the first user. As an example and not by way of limitation, if a user is one mile from an airport and two miles from a gas station, social-networking system 1660 may determine that the user has a higher coefficient for the airport than the gas station based on the proximity of the airport to the user.

In particular embodiments, social-networking system 1660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1660 may provide information that is relevant to user's interests and current circumstances, increasing the likelihood that they will find such information of interest. In particular embodiments, social-networking system 1660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1670 (e.g., via an API or other communication channel), or from another suitable system. In response to the request, social-networking system 1660 may calculate the coefficient (or access the coefficient information if it has previously been calculated and stored). In particular embodiments, social-networking system 1660 may measure an affinity with respect to a particular process. Different processes (both internal and external to the online social network) may request a coefficient for a particular object or set of objects. Social-networking system 1660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated herein by reference.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 1660, a client system 1630, a third-party system 1670, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 1704 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 1660 or shared with other systems (e.g., a third-party system 1670). Although this disclosure describes using particular privacy settings in a particular manner, this disclosure contemplates using any suitable privacy settings in any suitable manner.

In particular embodiments, privacy settings may be based on one or more nodes or edges of a social graph 1700. A privacy setting may be specified for one or more edges 1706 or edge-types of the social graph 1700, or with respect to one or more nodes 1702, 1704 or node-types of the social graph 1700. The privacy settings applied to a particular edge 1706 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 1660. The object may be associated with a concept node 1704 connected to a user node 1702 of the first user by an edge 1706. The first user may specify privacy settings that apply to a particular edge 1706 connecting to the concept node 1704 of the object, or may specify privacy settings that apply to all edges 1706 connecting to the concept node 1704. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 1660 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 1660 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 1670, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 1662 may be authorization/privacy servers for enforcing privacy settings. In response to a request from a user (or other entity) for a particular object stored in a data store 1664, the social-networking system 1660 may send a request to the data store 1664 for the object. The request may identify the user associated with the request and the object may be sent only to the user (or a client system 1630 of the user) if the authorization server determines that the user is authorized to access the object based on the privacy settings associated with the object. If the requesting user is not authorized to access the object, the authorization server may prevent the requested object from being retrieved from the data store 1664 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 1660, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 1660 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 1660 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 1660 may access such information in order to provide a particular function or service to the first user, without the social-networking system 1660 having access to that information for any other purposes. Before accessing, storing, or using such objects or information, the social-networking system 1660 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 1660.

In particular embodiments, a user may specify whether particular types of objects or information associated with the first user may be accessed, stored, or used by the social-networking system 1660. As an example and not by way of limitation, the first user may specify that images sent by the first user through the social-networking system 1660 may not be stored by the social-networking system 1660. As another example and not by way of limitation, a first user may specify that messages sent from the first user to a particular second user may not be stored by the social-networking system 1660. As yet another example and not by way of limitation, a first user may specify that all objects sent via a particular application may be saved by the social-networking system 1660.

In particular embodiments, privacy settings may allow a first user to specify whether particular objects or information associated with the first user may be accessed from particular client systems 1630 or third-party systems 1670. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 1660 may provide default privacy settings with respect to each device, system, or application, and/or the first user may be prompted to specify a particular privacy setting for each context. As an example and not by way of limitation, the first user may utilize a location-services feature of the social-networking system 1660 to provide recommendations for restaurants or other places in proximity to the user. The first user's default privacy settings may specify that the social-networking system 1660 may use location information provided from a client device 1630 of the first user to provide the location-based services, but that the social-networking system 1660 may not store the location information of the first user or provide it to any third-party system 1670. The first user may then update the privacy settings to allow location information to be used by a third-party image-sharing application in order to geo-tag photos.

In particular embodiments, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular embodiments, for particular objects or information having privacy settings specifying that they are ephemeral, the social-networking system 1660 may be restricted in its access, storage, or use of the objects or information. The social-networking system 1660 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the social-networking system 1660 may temporarily store the message in a data store 1664 until the second user has viewed or downloaded the message, at which point the social-networking system 1660 may delete the message from the data store 1664. As another example and not by way of limitation, continuing with the prior example, the message may be stored for a specified period of time (e.g., 2 weeks), after which point the social-networking system 1660 may delete the message from the data store 1664.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

Systems and Methods

Figure 18:
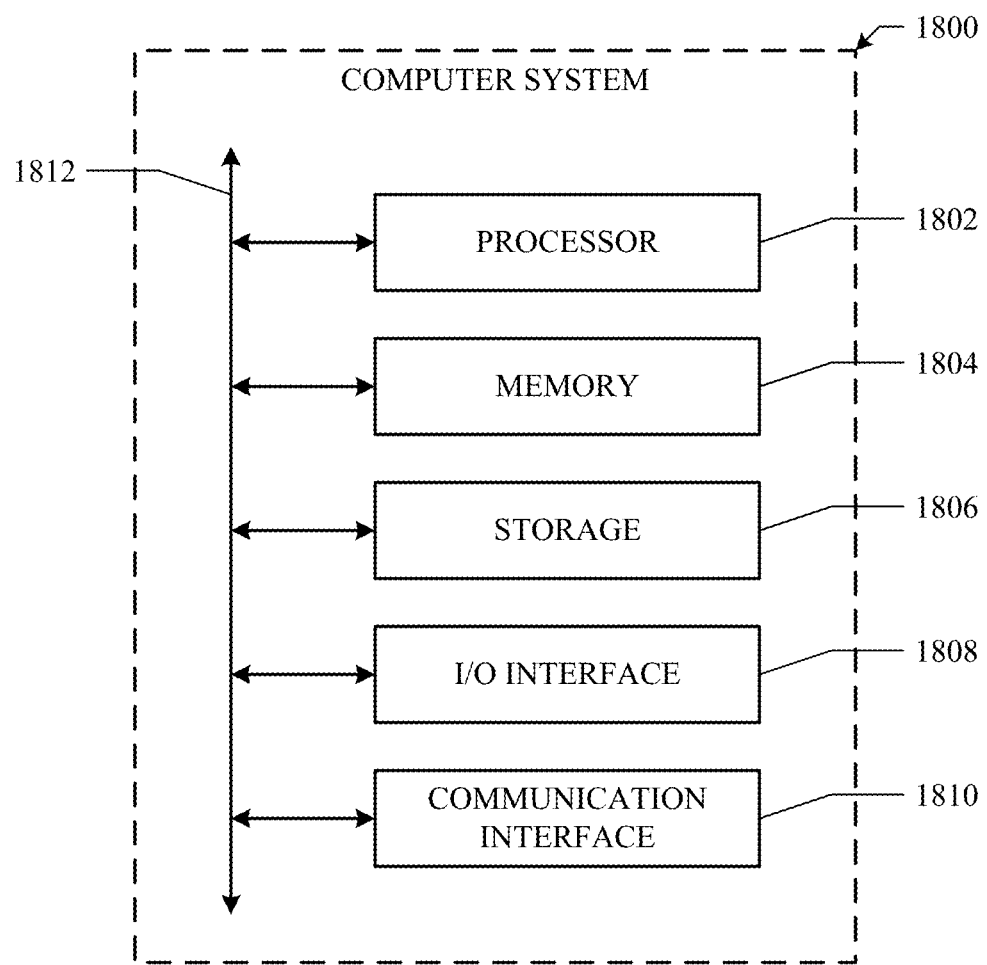
FIG. 18 illustrates an example computer system.

FIG. 18 illustrates an example computer system 1800. In particular embodiments, one or more computer systems 1800 perform one or more steps of one or more methods described or illustrated herein. In particular embodiments, one or more computer systems 1800 provide functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, and vice versa, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1800 may include one or more computer systems

1800; be unitary or distributed; span multiple locations; span multiple machines; span multiple data centers; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memories 1804, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   rendering an augmented-reality environment on a display associated with a first computing device associated with a first user;
   identifying one or more objects within the augmented-reality environment;
   accessing a data store that comprises one or more augmented-reality content items;
   calculating, for each of the augmented-reality content items, a relevance score based on:
   one or more characteristics of one of more of the objects identified within the augmented-reality environment; and
   social-networking information associated with the first user;
   determining, based on their relevance scores, one or more augmented-reality content items to suggest to the first user for one or more of the objects identified within the augmented-reality environment; and
   suggesting the one or more determined augmented-reality content items to the first user by presenting the one or more determined augmented-reality content items to the first user for selection to be included within the augmented-reality environment.

2. The method of claim 1, wherein presenting the one or more determined augmented-reality content items to the first user comprises presenting the one or more determined augmented-reality content items within a suggestions interface rendered within a sub-region of the display.

3. The method of claim 1, wherein
one or more of the augmented-reality content items are associated with a second user;
the social-networking information associated with the first user comprises information about a degree of separation between the first user and the second user; and
determining one or more augmented-reality content items to suggest to the first user is further based on information associated with the second user.

4. The method of claim 1, wherein determining one or more augmented-reality content items based on their relevance scores comprises identifying one or more augmented-reality content items with scores greater than a pre-determined threshold.

5. The method of claim 1, wherein determining one or more augmented-reality content items to suggest to the first user is further based on one or more of:
a current location of the first user;
an event that is determined to be occurring currently; or
a current date or time.

6. The method of claim 1, wherein determining one or more augmented-reality content items based on their relevance scores comprises ranking the augmented-reality content items based on their relevance scores.

7. The method of claim 1, wherein the social-networking information associated with the first user comprises one or more of:
an affinity coefficient between the first user and the augmented-reality content item; or
demographic information associated with the first user.

8. The method of claim 1, wherein the identified objects are objects within the augmented-reality environment that are within a focal region of the display associated with the first computing device.

9. The method of claim 1, further comprising:
receiving an input at the first computing device selecting one of the suggested augmented-reality content items; and
modifying a particular identified object, wherein the modifying comprises altering the particular identified object based on the selected suggested augmented-reality content item.

10. The method of claim 9, wherein the selected suggested augmented-reality content item comprises a mask and the particular identified object comprises a face.

11. The method of claim 9, wherein the selected suggested augmented-reality content item comprises a filter.

12. The method of claim 9, wherein the selected suggested augmented-reality content item comprises a drawing.

13. The method of claim 1, further comprising:
receiving a content-selection input at the first computing device that selects one of the suggested augmented-reality content items;
receiving a content-placement input at the first computing device that specifies a location within the augmented-reality environment; and
placing the suggested augmented-reality content item selected by the content-selection input at the location specified by the content-placement input.

14. The method of claim 1, further comprising:
receiving a content-modification input at the first computing device that specifies a modification to one of the suggested augmented-reality content items;
causing an instance of the suggested augmented-reality content item to be modified.

15. The method of claim 14, further comprising:
uploading the modified instance of the suggested augmented-reality content item to a server; and
receiving a privacy-settings input from the first user, wherein the privacy-settings input specifies criteria that authorizes one or more fourth users to access the modified instance of the suggested augmented-reality content item.

16. The method of claim 1, wherein:
the augmented-reality environment is rendered on the display by the first computing device;
identifying one or more objects within the augmented-reality environment, accessing the data store that comprises the augmented-reality content items, calculating the relevance scores of the augmented-reality content items, and determining the augmented-reality content items to suggest to the first user comprises, by the first computing device, communicating one or more requests to one or more servers and receiving one or more responses from one or more of the servers; and
the determined augmented-reality content items are suggested to the first user by the first computing device by presenting the one or more determined augmented-reality content items to the first user for selection to be included within the augmented-reality environment.

17. The method of claim 1, wherein:
the augmented-reality environment is rendered on the display by the first computing device;
the one or more objects within the augmented-reality environment are identified locally by the first computing device;
the data store that comprises one or more augmented-reality content items is accessed by the first computing device;
the relevance scores for the augmented-reality content items are calculated by the first computing device;
the augmented-reality content items to suggest to the first user are determined by the first computing device; and
the determined augmented-reality content items are suggested to the first user by the first computing device by presenting the one or more determined augmented-reality content items to the first user for selection to be included within the augmented-reality environment.

18. One or more computer-readable non-transitory storage media embodying software that is operable when executed to:
render an augmented-reality environment on a display associated with a first computing device associated with a first user;
identify one or more objects within the augmented-reality environment;
access a data store that comprises one or more augmented-reality content items;
calculate, for each of the augmented-reality content items, a relevance score based on:
one or more characteristics of one of more of the objects identified within the augmented-reality environment; and
social-networking information associated with the first user;

determine, based on their relevance scores, one or more augmented-reality content items to suggest to the first user for one or more of the objects identified within the augmented-reality environment; and suggest the one or more determined augmented-reality content items to the first user by presenting the one or more determined augmented-reality content items to the first user for selection to be included within the augmented-reality environment.

19. The media of claim 18, wherein one or more of the augmented-reality content items are associated with a second user, wherein the social-networking information associated with the first user comprises information about a degree of separation between the first user and the second user, and wherein determining one or more augmented-reality content items to suggest to the first user is further based on information associated with the second user.

20. A system comprising: one or more processors; and one or more computer-readable non-transitory storage media coupled to one or more of the processors and comprising instructions operable when executed by one or more of the processors to cause the system to:

render an augmented-reality environment on a display associated with a first computing device associated with a first user;

identify one or more objects within the augmented-reality environment;

access a data store that comprises one or more augmented-reality content items;

calculate, for each of the augmented-reality content items, a relevance score based on:
  one or more characteristics of one of more of the objects identified within the augmented-reality environment; and
  social-networking information associated with the first user;

determine, based on their relevance scores, one or more augmented-reality content items to suggest to the first user for one or more of the objects identified within the augmented-reality environment; and suggest the one or more determined augmented-reality content items to the first user by presenting the one or more determined augmented-reality content items to the first user for selection to be included within the augmented-reality environment.

\* \* \* \* \*